US012804354B2

(12) United States Patent
Deng et al.

(10) Patent No.: US 12,804,354 B2
(45) Date of Patent: Nov. 17, 2026

(54) RESCUE SYSTEM AND RESCUE DEVICE TO FACILITATE RESCUE

(71) Applicant: Altai Technologies Limited, New Territories (HK)

(72) Inventors: Hao Long Deng, New Territories (HK); Tsun Man Chu, New Territories (HK); Hang Ching Jason Leung, New Territories (HK); Ka Ki Leung, New Territories (HK); Siu Hong Leung, New Territories (HK)

(73) Assignee: Altai Technologies Limited, New Territories (HK)

( * ) Notice: Subject to any disclaimer, the term of this patent is extended or adjusted under 35 U.S.C. 154(b) by 312 days.

(21) Appl. No.: 18/606,077

(22) Filed: Mar. 15, 2024

(65) Prior Publication Data

US 2025/0294319 A1 Sep. 18, 2025

(51) Int. Cl.

*H04W 4/029* (2018.01)
*H04W 4/90* (2018.01)
*H04W 84/12* (2009.01)

(52) U.S. Cl.

CPC ............ *H04W 4/029* (2018.02); *H04W 4/90* (2018.02); *H04W 84/12* (2013.01)

(58) Field of Classification Search

CPC ........ H04W 4/029; H04W 4/90; H04W 84/12
See application file for complete search history.

(56) References Cited

U.S. PATENT DOCUMENTS

| | | | | |
|---|---|---|---|---|
| 10,009,733 B2 * | 6/2018 | Babu | H04W 4/029 | |
| 10,764,717 B1 * | 9/2020 | Keal | H04W 4/029 | |
| 11,096,008 B1 * | 8/2021 | Batten | H04W 4/021 | |
| 11,153,720 B1 * | 10/2021 | Newton | H04W 24/02 | |
| 2004/0082341 A1 * | 4/2004 | Stanforth | G01S 5/0289 | 455/456.1 |
| 2005/0048990 A1 * | 3/2005 | Lauriol | H04W 64/00 | 455/456.1 |
| 2006/0273894 A1 * | 12/2006 | Goehler | G08B 25/009 | 340/539.13 |
| 2008/0268873 A1 * | 10/2008 | Wymeersch | G01S 5/0289 | 455/456.6 |
| 2011/0238751 A1 * | 9/2011 | Belimpasakis | H04L 67/52 | 715/764 |
| 2014/0222329 A1 * | 8/2014 | Frey | G08B 7/066 | 701/423 |
| 2015/0249907 A1 * | 9/2015 | Gupta | H04W 4/043 | 455/456.1 |
| 2015/0348220 A1 * | 12/2015 | Sharma | G01C 21/3407 | 705/324 |

(Continued)

*Primary Examiner* — Nathan A Mitchell

(74) *Attorney, Agent, or Firm* — Renner, Kenner, Greive, Bobak, Taylor & Weber

(57) ABSTRACT

A rescue system for facilitating rescue of a distressed person including at least one rescue device including at least one wireless network access point device, the wireless network access point device configured to transmit wireless messages and receive wireless messages from a personal mobile device, a location processor configured to process the received wireless messages from the personal mobile device and identify the personal mobile device as being a personal mobile device being associated with a distressed person, the position of the personal mobile device based on data included in the received wireless messages.

16 Claims, 13 Drawing Sheets

(56) References Cited

U.S. PATENT DOCUMENTS

| | | | | |
|---|---|---|---|---|
| 2016/0007179 | A1* | 1/2016 | Kim | G08B 7/066<br>455/404.1 |
| 2016/0018507 | A1* | 1/2016 | Chen | G01S 5/02524<br>455/456.2 |
| 2016/0142884 | A1* | 5/2016 | Sears | H04W 40/244<br>455/404.2 |
| 2018/0302777 | A1* | 10/2018 | Klein | G06Q 90/205 |
| 2019/0020978 | A1* | 1/2019 | Finschi | G01S 5/0295 |
| 2022/0349726 | A1* | 11/2022 | Golden | G08B 25/00 |
| 2023/0232187 | A1* | 7/2023 | Al-Qutami | H04W 4/33<br>455/456.1 |
| 2023/0328678 | A1* | 10/2023 | Zorgui | H04W 64/00<br>455/435.1 |

* cited by examiner

RESCUE SYSTEM AND RESCUE DEVICE TO FACILITATE RESCUE

TECHNICAL FIELD

The present invention relates to a rescue system to facilitate rescue of a distressed person. The present invention further relates to a rescue device including a wireless network access point device that is used as part of a rescue system to locate and facilitate rescue of a distressed person.

BACKGROUND

Hiking, hunting and other outdoor activities are common pursuits engaged by many people. A small number of people every year get lost or stranded or injured when engaging in these outdoor activities either on land or at sea. These lost or injured persons (e.g., distressed persons or victims) require rescue from appropriate government authorities e.g., search and rescue department or police or fire departments or coast guards etc.

Often people travel to quite remote locations where there is no cell phone reception (i.e., no cellular signals) or internet access. This makes contacting rescue authorities more difficult. Further it may take several days for a distressed person to be reported as a missing person, further increasing the chances of an unsuccessful rescue or further harm coming to the distressed person.

Current outdoor rescue methods generally rely on humans searching an area using systematic manual search techniques. In some instances, drones or helicopters or other vehicles can be used to assist in searching. In some other instances, rescue dogs are used. However, dogs are not commonly available, may be expensive to operate and are only useful if there is a fresh scent trail. In some instances, there are hardware equipment such as cell phones with satellite navigation system or satellite phones that are available. These cell phones can be quite specialised that are configured to store cell phone positioning information at regular intervals and then transmit this positioning information to a specific server once the cell phone reconnects to an available network. Other devices such as emergency beacon watches or satellite navigation system enabled rescue devices are also available.

These devices often can be quite specialised, are not commonly used and can be expensive. Furthermore, these devices lack a simple and convenient way to present information and provide information prompts to rescue authorities and the distressed person. These rescue specific devices or cell phones (e.g., smartphones or tablets or other mobile devices) rely on having access to a communications network. Most distressed persons end up in a situation where there is no available network. This makes rescue difficult since the stored satellite navigation system information relies on the distressed person to use an available network. Search and rescue teams also cannot actively find a distressed person since there is no location information available.

The current rescue methods can also be quite expensive due to high labour costs. Often rescue teams require a lot of manpower (i.e., large number of personnel) to search a given area. The rescue methods often require manual searching a large area around the last known location. The search techniques are slow and laborious. Current rescue techniques further rely on the experience of the rescue team which can make rescue efforts take a long time and challenging. It can take a long time to pinpoint the location of the distressed person, as current rescue techniques rely on manual searching of an area

SUMMARY OF THE INVENTION

The present invention relates to a rescue system to rescue a distressed person. The present invention further relates to a rescue device that is used as part of a rescue system to locate and rescue a distressed person. The rescue system comprises one or more rescue devices that each comprise a wireless network access point. The wireless network access points establish a wireless network and the wireless network signals are used to identify and locate a mobile device associated with a distressed person missing in a search area.

In one aspect the present invention relates to a rescue system for facilitating rescue of a distressed person comprising:

at least one rescue device comprising at least one wireless network access point device, the wireless network access point device configured to transmit wireless messages and receive wireless messages from a personal mobile device, a location processor configured to process the received wireless messages from the personal mobile device and identify:

the personal mobile device as being a personal mobile device being associated with a distressed person, the position of the personal mobile device based on data included in the received wireless messages.

In one example the wireless network access point device is a Wi-Fi access point device that is configured to transmit Wi-Fi messages and receive Wi-Fi messages from a personal mobile device.

In one example the received messages comprise at least one of an SSID, signal strength indicator or device connection status, and, the location processor configured to:

identify the personal mobile device based on the SSID and, determine the position of the personal mobile device based on the signal strength indicator.

In one example the location processor is integrated into the rescue device or the location processor is disposed in a rescue agency computing system, and wherein the Wi-Fi access point device is arranged in electronic communication with the location processor and the Wi-Fi access point device is configured to provide the received Wi-Fi messages to the location processor.

In one example wherein the personal mobile device comprises a rescue application, the rescue application is configured to operate one or more of:

a Wi-Fi scanner of the mobile device, a hotspot function of the mobile device, location process of the mobile device to gather location information of the mobile device, and the mobile device is configured to provide one or more messages to the Wi-Fi access point device to facilitate rescue of the distressed person.

The rescue application may be stored in a memory unit of the mobile device. The rescue application may be activated by a user manually. Alternatively, the rescue application may passively operate in the background.

In a further example the rescue application may also be activated if a fall is detected based on the IMU of the mobile device or an accelerometer or a gyroscope. In a further example the rescue application may further be configured to be activated if the phone does not move for more than a threshold time. In another example the rescue application may be activated if a trigger word e.g., help or activate is detected by a microphone of the mobile device.

In one example in an operational mode, the rescue application is configured to activate a hotspot function of the mobile device to establish a Wi-Fi network, the Wi-Fi access point device is configured to transmit a wireless message to explore an area for available networks, wherein the wireless message is a connection request, the Wi-Fi access point device is configured to receive a wireless response message from the mobile device hotspot in response to the mobile device receiving the connection request from the Wi-Fi access point device, the wireless response message from the mobile device including information related to the mobile device, the location processor is configured to process the information related to the mobile device to identify the mobile device the position of the mobile device based on data included in the wireless response message, and wherein the wireless response message comprises at least one of the SSID, signal strength indicator or connection status.

In another example in an operational mode the rescue application is configured to activate the Wi-Fi scanner of the mobile device, the Wi-Fi scanner is configured to scan a local area for an available Wi-Fi network by transmitting one or more wireless messages, the Wi-Fi access point device configured to receive the wireless messages and transmit a wireless response message, the wireless message received from the mobile device including information related to the mobile device, the location processor configured to process the information related to the mobile device to identify the mobile device and position of the mobile device to facilitate rescue of the distressed person associated with the mobile device.

In a further example in an operational mode the rescue application is configured to activate the hotspot function of the mobile device and activate the Wi-Fi scanner of the mobile device, the Wi-Fi access point device is configured to transmit one or more wireless messages to explore an area for available networks, the Wi-Fi access point device is configured to receive a wireless response message from the mobile device hotspot in response to the mobile device receiving at least one of the one or more wireless messages from the Wi-Fi access point device, the wireless response message from the mobile device including information related to the mobile device, the Wi-Fi scanner is configured to scan a local area for an available Wi-Fi network by transmitting one or more wireless messages, the Wi-Fi access point device configured to receive at least one wireless message from the Wi-Fi scanner and transmit a wireless response message, the wireless message received from the mobile device including information related to the mobile device, the location processor being configured to process the information related to the mobile device within received wireless response and the information related to the mobile device within received wireless message to identify the mobile device and the position of the mobile device to facilitate rescue of the distressed person associated with the mobile device.

In one example the wireless message transmitted from the Wi-Fi scanner is a probe request, the Wi-Fi access point device configured to transmit a probe response in response to receiving the probe request, and; the Wi-Fi access point device configured to transmit a probe request to the mobile device hotspot and receive a probe response from the probe response from the mobile device hotspot.

In one example operational mode the Wi-Fi access point device is configured to exchange wireless messages e.g., Wi-Fi messages between the mobile device, the Wi-Fi access point device is configured to receive wireless messages e.g., Wi-Fi messages from the mobile device, and the Wi-Fi access point device is configured to process the received Wi-Fi messaged from the mobile device to locate the mobile device based on data included in the Wi-Fi messages from the mobile device.

In one example the location processor is configured to receive the probe response and process the probe response to identify the mobile device based on the SSID included within the probe response and determine a position of the mobile device relative to the rescue device based on the signal strength indicator included in the probe response.

In one example the rescue system comprises a plurality of rescue devices, each rescue device comprising a Wi-Fi access point device, wherein at least one Wi-Fi access point device is configured to detect a hotspot of the mobile device, and wherein at least another Wi-Fi access point device is configured to communicate with a Wi-Fi scanner of the mobile device.

In one example each rescue device is configured to transmit location information defining a location of the rescue device, the location processor configured to track the location of each rescue device based on the received location information, the location processor further configured to the position of the mobile device based on the relative signal strength detected at each rescue device.

In one example the location processor is implemented in a rescue agency computing system that is configured to wirelessly communicate with each rescue device.

In a further example the rescue application is configured to:

reactivate the hotspot function if the hotspot function is switched off, and/or, reactivate the Wi-Fi scanner if the Wi-Fi scanner is switched off.

In one example the rescue system comprises a location application executable by the location processor, wherein the location application when executed causing the location processor to:

determine the position of the mobile device based on signal strength included in the received probe request, or determine the location of the mobile device based on a signal strength indicator included within a received probe request from the mobile device and the location information included in the location signals.

In one example the rescue device is configured to generate an alert if a mobile device is detected, wherein the alert may be one more of: an audible alert, a visual alert, a haptic alert or vibrational alert.

In one example the location application is configured to control the location processor to:

generate or access a map of a search area, determine a location of the rescue device based on transmitted location information of the rescue device, calculate a rescue path to the determined location of the mobile device, plot the rescue path on the map, present the rescue path and map on a user interface of the rescue device and/or present the location of the rescue device and the mobile device and movement of the rescue device along the rescue path.

In one example each rescue device is a portable rescue device capable of being carried by a rescue operator or mounted on a rescue vehicle, wherein location processor is configured to calculate a search path for each rescue device within the search area, the search path may be any one or more of:

a parallel track search pattern, a sector search pattern, an expanding search pattern.

In one example the location processor is configured to:

track the position of each rescue device on the search path, track the position of each rescue device relative to other rescue devices, and, each rescue device comprising a user interface, and the search path of each rescue device, the position of each rescue device on the search path and the position of each rescue device relative to the other rescue devices is presented on user interface of the rescue device.

In one example the rescue system comprising a plurality of rescue devices, each rescue device comprise a Wi-Fi access point device, one or more Wi-Fi access point devices configured to receive one or more wireless messages from a mobile device, the one or more Wi-Fi access point devices that received a wireless message are further configured to share the received wireless messages with the other Wi-Fi access point devices, the shared wireless messages may comprise an RSSI value and the shared wireless messages may be used by the plurality of rescue devices to determine a location of the mobile device.

In one example the location processor is configured to:

receive data from the Wi-Fi access point devices, wherein the received data comprises location information and/or RSSI values, determine a search footprint based on the data, wherein the search footprint indicates a possible area the mobile device is likely within, presenting the search footprint on a display.

The search footprint may be determine based on the RSSI values determined by the one or more Wi-Fi access point devices. Optionally, the location processor may further calculate a rescue path to a determined location of the user. The rescue path being presented on the display with the search footprint.

In a second aspect the present invention relates to a rescue device for use in a rescue system to facilitate rescue of a distressed person comprising:

a wireless network access point device, a power supply electrically coupled to the wireless network access point device, wherein the wireless network access point device configured to establish a wireless network by transmitting wireless messages to and receiving wireless messages from one or more mobile devices, and, wherein data included in the wireless messages is used to identify a mobile device associated with a distressed person and identify a position of the mobile device to facilitate rescue of the distressed person.

In one example the wireless network access point device is a Wi-Fi access point device that is configured to establish a Wi-Fi network, the rescue device comprises a location processor electronically coupled to the Wi-Fi access point device, the location processor including a location application executable by the location processor, the location processor is configured to process the received wireless messages from the personal mobile device and identify:

the personal mobile device as being a personal mobile device being associated with a distressed person, the position of the personal mobile device based on data included in the received wireless messages, location application executable by the location processor, wherein the location application when executed causing the location processor to:

determine the position of the mobile device based on signal strength included in the received probe request, or determine the location of the mobile device based on a signal strength indicator included within a received probe request from the mobile device and the location information included in the location signals, generate or access a map of a search area, determine a location of the rescue device based on transmitted location information of the rescue device, calculate a rescue path to the determined location of the mobile device, plot the rescue path on the map, present the rescue path and map on a user interface of the rescue device and/or present the location of the rescue device and the mobile device and movement of the rescue device along the rescue path.

In a third aspect the present invention relates to a rescue application comprising instructions which, when the application is executed by a personal mobile device, causes the personal mobile device to:

the rescue application is configured to operate one or more of:

a Wi-Fi scanner of the mobile device, a hotspot function of the mobile device, location process of the mobile device to gather location information of the mobile device, and the mobile device is configured to provide one or more messages to a rescue device including a Wi-Fi access point device to facilitate rescue of the distressed person.

The term “comprising” (and its grammatical variations) as used herein are used in the inclusive sense of “having” or “including” and not in the sense of “consisting only of.”

BRIEF DESCRIPTION OF THE DRAWINGS

Embodiments of the present invention will now be described, by way of example, with reference to the accompanying drawings in which.

DETAILED DESCRIPTION OF ILLUSTRATIVE EMBODIMENTS

The present invention relates to a rescue system to facilitate rescue of a distressed person. The present invention further relates to a rescue device including a wireless network access point device that is used as part of a rescue system to locate and facilitate rescue of a distressed person. The present invention may further relate to a rescue application that may be installed on a personal mobile device of the distressed person. The rescue application is configured to control the personal mobile device to broadcast and receive wireless messages to and from the rescue device to facilitate identification of the distressed person based on the identification (i.e., ID) of their associated mobile device and determining the location of the distressed person based on locating the mobile device.

A distressed person is a person who needs rescue from a rescue agency (e.g., a rescue service) such as for example, the fire department, police, coast guard, search and rescue department, volunteer groups or any other suitable government or official rescue agency. The distressed person may be a person who is lost, disoriented, injured, exhausted, a victim of a crime or unfortunate circumstances, or any other reason that may require assistance or a rescue operation of the distressed person.

Figure 1:
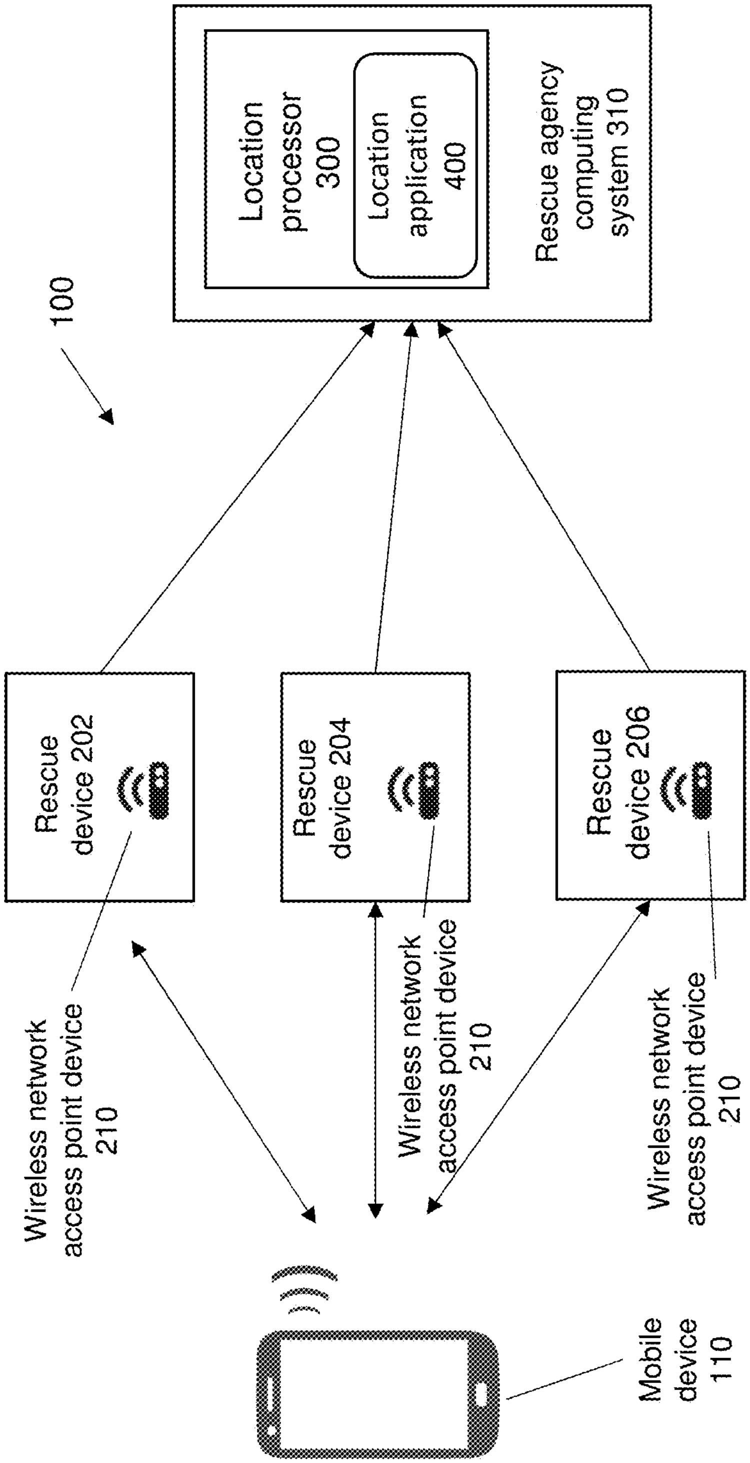
FIG. 1 illustrates an example embodiment of a rescue system including one or more rescue devices.

Referring to FIG. 1, an example embodiment of the rescue system 100 is illustrated. This embodiment is arranged to provide a rescue system for facilitating rescue of a distressed person comprising: a rescue device comprising one or more wireless network access point devices, the wireless network access point device configured to transmit wireless messages and receive wireless messages from a personal mobile device, a location processor configured to process the received wireless messages from the personal mobile device and identify: the personal mobile device as being a personal mobile device being associated with a distressed person, and the position of the personal mobile device based on data included in the received wireless messages.

In this example the rescue system 100 comprises a plurality of rescue devices 202, 204, 206 that are configured to communicate with a personal mobile device 110 of a distressed person. The system 100 may comprise at least one rescue device 200. The personal mobile device 110 may be any mobile device that includes wireless communication capabilities. In particular, the personal mobile device may comprise wireless networking functionality such as, for example, Wi-Fi communication functionality and/or cellular communication functionality and/or satellite navigation system functions. The personal mobile device 110 is associated with e.g., linked to a distressed person. The personal mobile device 110 may be any one or more of; a smartphone, tablet, laptop, wearable (e.g., smartwatch or fitness tracker), smart glasses or other similar devices. The mobile device 110 at least comprises wireless communication functions e.g., Wi-Fi functionality.

As shown in FIG. 1, the personal mobile device 110 is configured to wirelessly communicate with the rescue devices 202, 204, 206. The rescue devices 202, 204, 206 and the mobile device 110 are configured to communicate using wireless communication protocols. The rescue devices 202, 204, 206 are further configured to communicate with a location processor 300. Each rescue device 202-206 may comprise a wireless access point device 210.

In this example, the location processor 300 comprises wireless communication functions to allow the location processor 300 to communicate with the rescue devices 202, 204, 206. The location processor 300 may also be implemented by use of a computing system. The location processor 300 may be implemented by any computing architecture, including portable computers, tablet computers, stand-alone Personal Computers (PCs), smart devices, Internet of Things (IoT) devices, edge computing devices, client/server architecture, "dumb" terminal/mainframe architecture, cloud-computing based architecture, or any other appropriate architecture.

In one example the location processor 300 may implemented a rescue agency computing system 310 that is configured to wirelessly communicate with each rescue device 202-206. The rescue agency computing system 310 may be associated with a single rescue agency e.g., Government Flying Services, Fire departments or Police Force or search and rescue or coastguard. The rescue agency computing system 310 may be a shared system that is shared across multiple rescue agencies. The rescue agency computing system 310 may comprise multiple sub systems and components. The location processor 300 and associated applications may be implemented as part of the rescue agency computing system 300. The rescue agency computing system 310 may be implemented by any computing architecture, including portable computers, tablet computers, stand-alone Personal Computers (PCs), smart devices, Internet of Things (IoT) devices, edge computing devices, client/server architecture, "dumb" terminal/mainframe architecture, cloud-computing based architecture, or any other appropriate architecture.

The location processor 300 further comprises a location application 400 (i.e., location app). The location processor 300 may be implemented in the rescue agency computing system 310, as shown in FIG. 1. The location processor 300 may include a processing unit and a memory unit. The location application 400 may be stored in a memory unit and is executable by the processing unit. The location application when executed is configured to cause the location processor to perform one or more of the following functions: determine the position of the mobile device based on signal strength included or stored in the received probe request or determine the location of the mobile device based on a signal strength indicator included within a received probe request from the mobile device and the location information included or stored in the location signals. The signal strength information can be used to triangulate the position of the mobile device.

In a further alternative example form, the location processor may be implemented as a stand-alone computing device having any suitable computing architecture such as for example portable computers, tablet computers, stand-alone Personal Computers (PCs), smart devices, edge computing devices, client/server architecture, or another suitable computing architecture.

The system 100 may comprise multiple wireless access point devices. Each rescue device comprises a single wireless access point device 210 integrated therein or attached to it. The location processor 300 may be configured to pair with one or more wireless access point devices (i.e., pair with the rescue devices 202-206). The location processor 300 may be configured to automatically check with wireless access point devices are paired with and communicate with the paired wireless access point devices and the rescue device of the paired wireless access point device 210. The location processor 300 is configured to receive information from the paired rescue devices 202-206.

Figure 2:
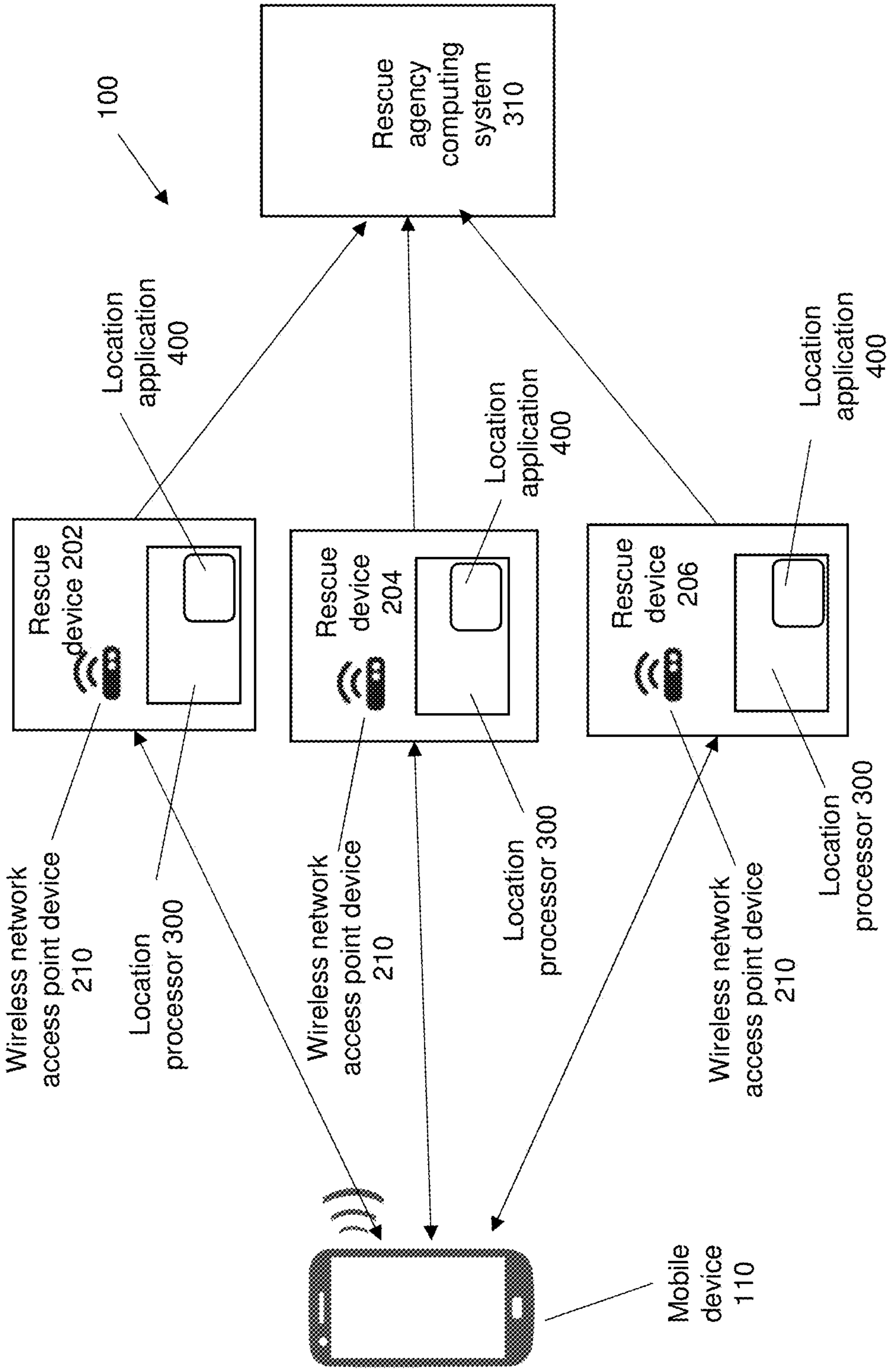
FIG. 2 illustrates a further example embodiment of a rescue system.

FIG. 2 illustrates a further example of a rescue system 100. The rescue system 100 still comprises one or more rescue devices, each configured to wirelessly communicate with a personal mobile device or with multiple personal mobile devices. As shown in FIG. 2, each rescue device 202-206 may comprise location processor 300. Each location processor 300 may include the location application 400 stored thereon and executable by the location processor 300.

Figure 3:
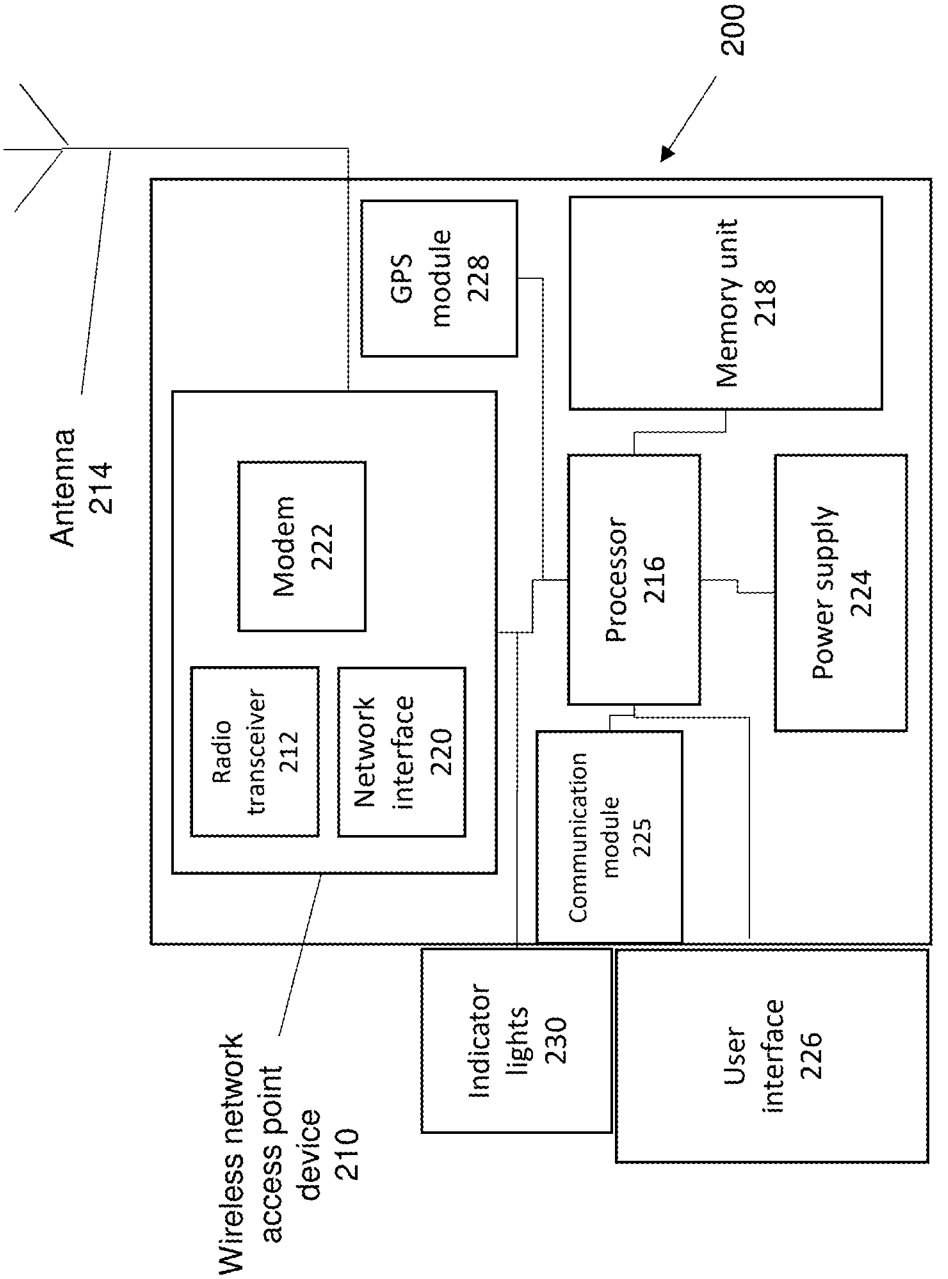
FIG. 3 illustrates a schematic diagram of an example rescue device and its components.

FIG. 3 illustrates an example embodiment of a rescue device 200. The rescue devices 202, 204, 206 may be the same as the rescue device 200 described in reference to FIG. 3. Referring to FIG. 3, the rescue device 200 comprises at least one wireless network access point device 210. In one example, the rescue device comprises a single wireless network access point device 210. In another example the rescue device 200 comprises a plurality of wireless network access point devices.

The wireless network access point device 210 comprises hardware and software to allow the access point device 210 to transmit wireless messages and receive wireless messages from the personal mobile device 110. The wireless network access point device 210 may be a Wi-Fi access point device that is configured to transmit Wi-Fi messages and receive Wi-Fi messages from a personal mobile device. The Wi-Fi access point device 210 (i.e., Wi-Fi access point 210) is configured to establish a Wi-Fi network.

The Wi-Fi access point device 210 further comprises a radio transceiver 212. The radio transceiver 212 is configured to send and receive wireless signals. The radio transceiver 212 is configured to covert data into radio waves to transmit it wirelessly and receive incoming data from connected devices e.g., the personal mobile device 110.

The Wi-Fi access point 210 comprises an antenna 214. The Wi-Fi access point 210 may comprise multiple antennas. The antenna 214 may be an internal antenna or an external antenna or a combination thereof. The antenna 214 may be removable or retrofittable into an antenna coupler to allow different antennas to be installed and uninstalled from the Wi-Fi access point device 210. The antenna 214 is configured improve the range and coverage of the Wi-Fi signal. The antennas are configured to transmit and receive radio waves i.e., signals to and from other devices such as the personal mobile device 110.

In one example, the antenna 214 may be a horizontal beamwidth 8*8 Multi-Input, Multi-Output (MIMO) in an integrated 8 cell antenna array. The 8-cell antenna array may be combined with smart antenna technology, for example, proprietary smart antenna technology for optimal uniform coverage over a large area as developed by manufactures such as ALTAI. The rescue device 200 may have a wireless range of up to 30 kilometres.

The Wi-Fi access point 210 comprises a processor 216 and a memory unit 218. The processor and memory are configured to handle the access point's internal operations, including managing connections, processing data and the access point firmware. The Wi-Fi access point 210 comprises firmware i.e., embedded software stored in the memory and executable by the processor 216. The firmware defines the functions and operations of the Wi-Fi access point and further manages network protocols, security features and other settings.

The Wi-Fi access point 210 may comprise network interface 220 such as an Ethernet port to connect to a wired network via a router or modem. Optionally the rescue device 200 may comprise an embedded modem 222 and the network interface 220 may be electronically coupled to the modem 222. The modem 222 may be cellular modem configured to connect to a cellular network. The network interface 220 allows the access point 210 to access the internet via the modem 222.

The rescue device 200 comprises a power supply 224. The power supply 224 is operatively coupled to the other components of the rescue device 200 to power the various components. The power supply 224 may be a battery or other similar power source. The rescue device 200 may comprise a communication module 225 configured to allow the rescue device 200 to communicate with the rescue device agency computing system 310. Optionally, the location processor 300 may be integrated into the rescue device 200.

The rescue device 200 comprises a user interface 226. The user interface 226 presents information to a user e.g., a rescue operator using the rescue device. The user interface 226 may be a screen e.g., an LCD screen or a touchscreen. The user interface 226 may alternatively comprise one or more lights e.g., LEDs or lamps that are visible by the rescue operator of the rescue device. Optionally, the rescue device 200 may also comprise a vibrational device that can be used to communicate with a rescue operator.

Figure 4:
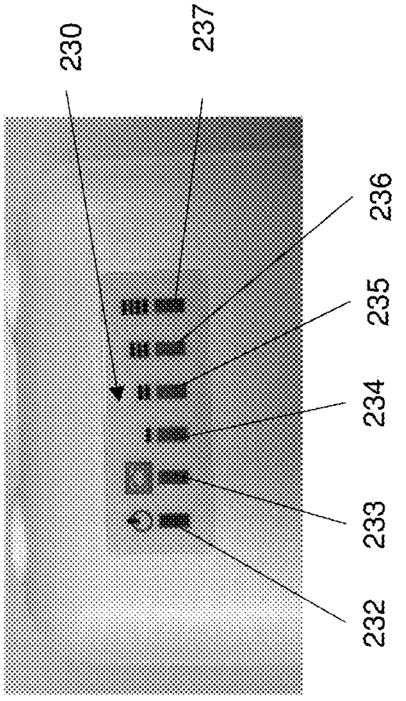
FIG. 4 illustrates a user interface comprising a plurality of lights of a rescue device.

FIG. 4 illustrates an example of a user interface 226 that comprises a plurality of indicator lights 230. Referring to FIG. 4, the lights 230 comprise a power light 232, a network connected status light 233, a minimal signal strength 234, a low signal strength light 235, a medium signal strength 236, and a high signal strength light 237. As the signal strength increases the appropriate signal strength light can be activated.

Optionally the rescue device 200 may include additional communication channels such as for example Bluetooth or Zigbee or other channels. Optionally, the rescue device 200 may also comprise a satellite positioning module, such as, GPS (global positioning system), BeiDou, GLONASS module 228. The satellite positioning module is configured to connect to a satellite navigation system (e.g. global positioning system, BeiDou, GLONASS etc) to determine the location of the rescue device 200 and track the location of the rescue device 200 as it is moved.

The rescue device 200 is preferably a portable device. In one form, the rescue device 200 is sized and shaped to be carried by a rescue operator. In other forms, the rescue device 200 is sized and shaped to be carried on a rescue vehicle such as a helicopter or a drone or a truck or other vehicle.

Figure 5:
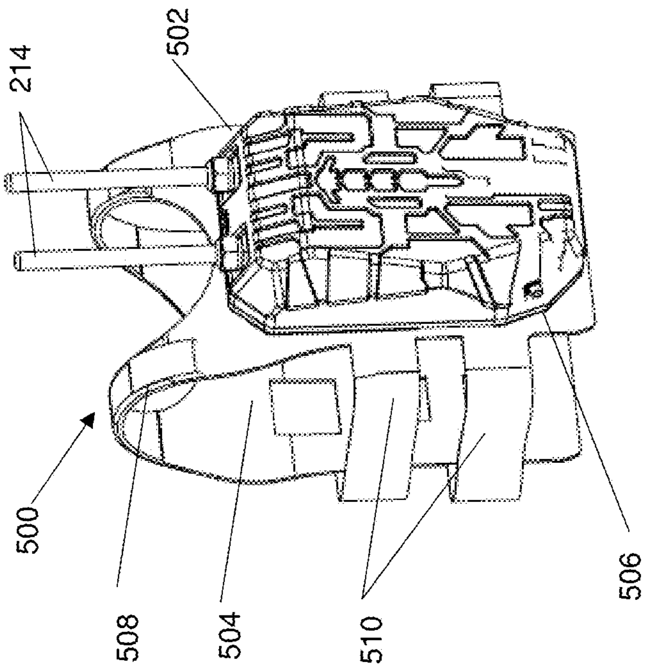
FIG. 5 illustrates a backpack rescue device that includes a rescue device mounted on a backpack structure to be carried by a rescue operator.

FIG. 5 illustrates an example of a backpack rescue device 500. The backpack rescue device 500 is similar in construction and includes the same components as the rescue device 200. The backpack rescue device 500 includes a housing 502. The housing 502 retains the components of the rescue device in reference FIG. 3. The housing 502 includes two external antennae 214. The backpack rescue device 500 can be removably fixed into a backpack 504 and the backpack retainer 506. The retainer 506 may include shoulder straps 508 and lateral straps 510. The backpack 504 and retainer 506 may be a semi rigid structure that can retain the rescue device 500.

Figure 6:
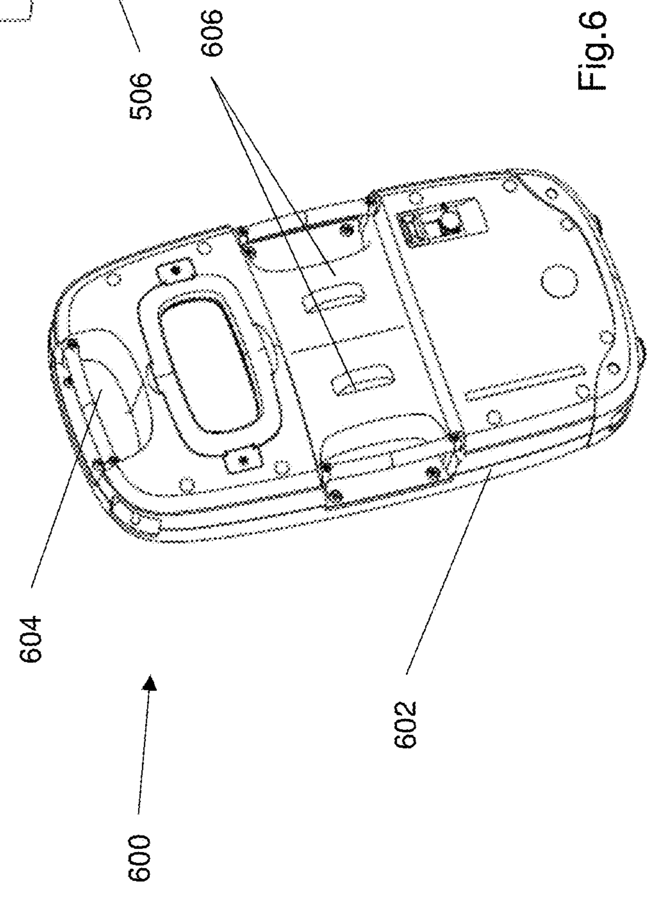
FIG. 6 illustrates an example rescue device that is shaped and structured to be mounted on a vehicle.

FIG. 6 illustrates a further form of a rescue device 600. The rescue device 600 may be a vehicle mounted rescue device 600. The rescue device 600 includes a housing 602. The vehicle mounted rescue device 600 comprises components like those described in FIG. 3. The vehicle mounted rescue device 600 includes a vehicle mount 604. The vehicle mount 604 can be hung or suspended from a drone or a helicopter by looping a cable through the vehicle mount 604. The rescue device 600 can be dangled from an aerial vehicle like a drone or a helicopter. The vehicle mounted rescue device 600 may further comprise additional mounting structures 606. The mounting structures 606 allow the rescue device 600 to be mounted on a land vehicle e.g., a car or a truck. The mounting structures 606 may clip into a complementary retainer (not shown). Alternatively, the rescue device 600 may be suspended on a land vehicle via the vehicle mount 604.

Figure 7:
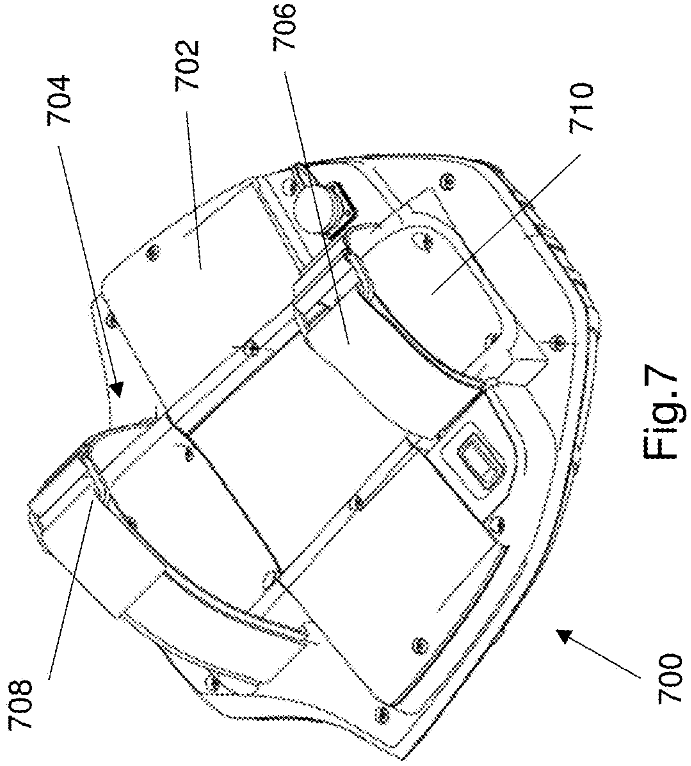
FIG. 7 illustrates an example rescue device that is shaped and structured to be hand carried by a rescue operator.

FIG. 7 illustrates another form of a rescue device 700. Referring to FIG. 7 there is shown a handheld rescue device 700. The handheld rescue device 700 includes a housing 702 that holds and retains the components of the rescue device described in relation to FIG. 3. The handheld rescue device 700 further comprises a handle 704. The strap arrangement 704 is disposed on the housing 702. The strap arrangement comprises two straps 706, 708. The device 700 may also include an arm channel 710 to receive an arm of the rescue operator. The strap arrangement allows a rescue operator to strap the rescue device 700 to an arm of the rescue operator. Alternatively, the device 700 may further comprise a handle. The rescue operator can carry the handheld rescue device 700 as the operator is moving along a rescue path or moving in a search area. The straps 704 may also be used to mount the rescue device 700 on a vehicle.

Figure 8:
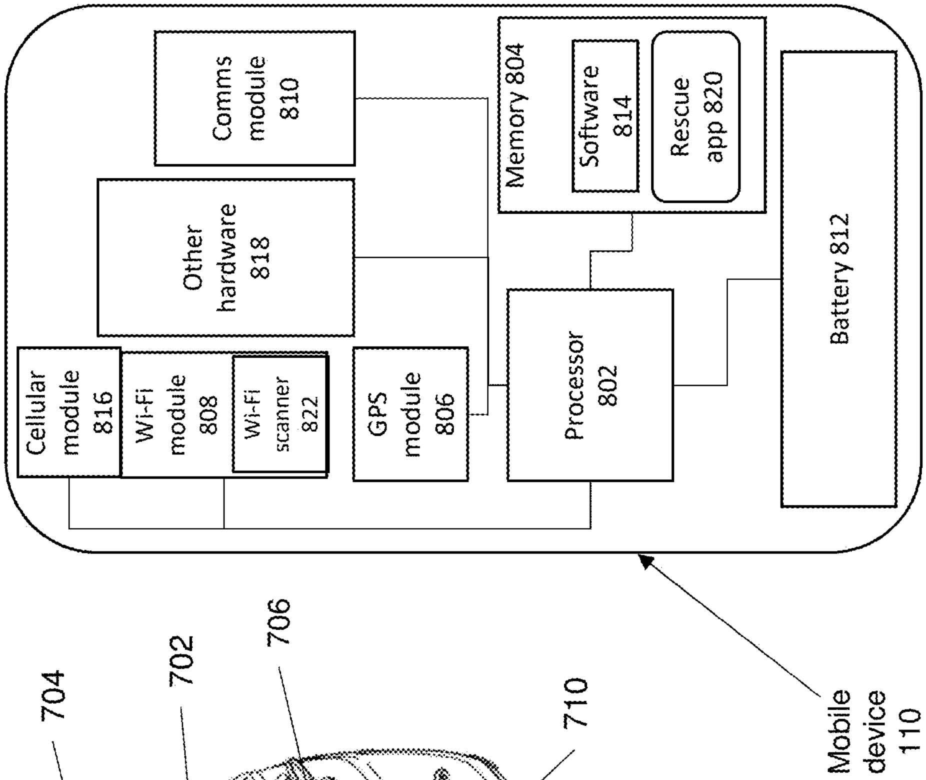
FIG. 8 illustrates a schematic diagram of an example mobile device with a rescue application installed in the mobile device.

Referring to FIG. 8 there is illustrated an example of a personal mobile device 110. The personal mobile device 110 comprises a processor 802, a memory 804, a satellite positioning module (such as GPS, BeiDou, GLONASS) 806, a Wi-Fi module 808, additional communications modules 810 (e.g., Bluetooth module), a battery 812, software 814, a cellular module 816 and other hardware components 818. The software 814 comprises appropriate software and firmware that defines and controls the mobile device operations. The mobile device 110 also includes a user interface e.g., a screen. The mobile device 110 further comprises a rescue application 820 installed in the memory 804 and executable by the processor 802. The rescue application 820 is downloadable and may be installed locally in a personal mobile device. The processor 802 may be electrically coupled to the components and control the components.

The Wi-Fi module 808 may include transceiver. The Wi-Fi module 808 is configured to transmit and receive wireless messages. The Wi-Fi module 808 may include a Wi-Fi scanner or may function as a Wi-Fi scanner. In the illustrated example, the Wi-Fi module 808 comprises a Wi-Fi scanner 822 that is configured to scan for available Wi-Fi networks. The Wi-Fi scanner 822 may be optional. The mobile device 110 comprises a Wi-Fi module that includes appropriate components that allow the mobile device 110 to communicate using the Wi-Fi protocol.

The mobile device 110 hotspot function may be activated in use. When the hotspot function is activated, the Wi-Fi module 808 may be configured to transmit advertise messages (e.g., beacon frames) to advertise the available Wi-Fi network. When the hotspot function of the mobile device 110 is activated, the Wi-Fi module may function as a Wi-Fi router to establish a Wi-Fi network. The internet may be accessed via the cellular module 816, and the Wi-Fi module 808 communicating with the cellular module.

The rescue application 820 is configured to operate one or more of: a Wi-Fi scanner of the mobile device, a hotspot function of the mobile device, location process (e.g. satellite navigation system) of the mobile device to gather location information of the mobile device. The mobile device 110 is configured to provide one or more wireless messages to the Wi-Fi access point device 210 and to facilitate rescue of the distressed person. The wireless messages may include, without limitations, probing requests or probe responses.

In use, the wireless network access point device 210 (i.e., the Wi-Fi access point device) is configured to transmit wireless messages and receive wireless messages from a personal mobile device 110. The location processor 300 is configured to process the received wireless messages from the personal mobile device 110 and identify: the personal mobile device as being a personal mobile device 110 being associated with a distressed person, and the position of the personal mobile device based on data included in the received wireless messages.

The received wireless messages at the location processor 300 comprise at least one of an SSID, signal strength indicator or device connection status. The location processor 300 is configured to: identify the personal mobile device based on the SSID and, determine the position of the personal mobile device based on the signal strength indicator. The wireless messages may also include an additional identifier e.g., a MAC address. Optionally location information may also be included or stored within the wireless messages.

The location processor 300 is integrated into the rescue device 200 or the location processor is disposed in a rescue agency computing system 310. The Wi-Fi access point device 210 is arranged in electronic communication (preferably wireless electronic communication) with the location processor 300. The Wi-Fi access point device 210 is configured to provide the received Wi-Fi messages to the location processor 300.

Persons engaging in hiking, caving, hunting and other outdoor activities may be encouraged to download the rescue application 820 and install it on their mobile device 110. The user may go through a registration process via the rescue application 820. The registration process may include registering a mobile ID e.g., the SSID of the mobile device, MAC address of the mobile device, the user's name, contact number, and emergency contacts. The information obtained during the registration process may be stored in the location processor 300 or may be stored in a database within a rescue agency computing system or may be stored in a separate database that may be accessible by the location processor 300 or the rescue agency computing system 310. The registered information can be used to help with rescue operations if a registered user gets in trouble. The registered information may optionally be included or stored in wireless messages exchanged between the mobile device 110 and the rescue device 300 (or rescue devices 300).

However, it is possible that persons engaging in outdoor activities may not have a rescue application installed. In these situations, a distressed person can still be located based on using wireless messages to and from the mobile device. The distressed person can be identified based on Wi-Fi messages transmitted and received from the mobile device.

The mobile device 110 may be configured to transmit wireless messages to locate one or more access point devices. The access point device (or devices) can exchange wireless messages with the mobile device. In one example, the wireless messages may be in the Wi-Fi protocol. The mobile device 110 may be configured to transmit Wi-Fi connection messages to locate a network provided by the access point devices. Alternatively, the access point devices may transmit connect messages to connect to the mobile device, and the mobile device can transmit responses. In one example, the mobile device is configured to transmit information to the access point devices. The access point devices are configured to locate the mobile device based on the information received from the mobile device.

Figure 9:
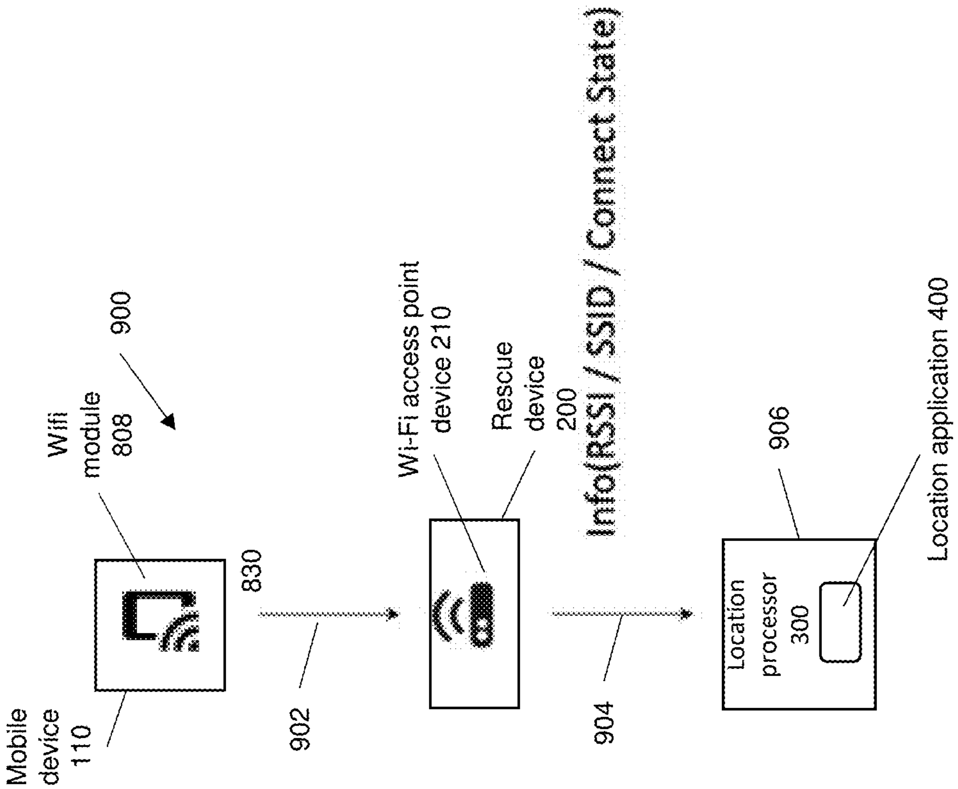
FIG. 9 illustrates an example of the operation of rescue device and the mobile device.

FIG. 9 illustrates an example of the operation of rescue device 300 and the mobile device 110. FIG. 9 illustrates an operational mode where the Wi-Fi module is activated to detect a wireless network i.e., detect one or more access points. The Wi-Fi module is used to wirelessly connect the mobile device 110 with the one or more access point devices.

One example method of operation 900 is shown in FIG. 9. In the operational mode of FIG. 9, the Wi-Fi module is activated to wirelessly locate and connect with one or more access point devices using the Wi-Fi protocol. At step 902 the Wi-Fi scanner 822 is configured transmit a wireless message 830. The wireless message may be Wi-Fi message. In one example, the message 830 may be a probe request or may be another request message to connect.

The Wi-Fi module 808 of the mobile device 110 may be configured to regularly transmit Wi-Fi messages 830. At step 904, the Wi-Fi access point device 210 is configured to receive the Wi-Fi messages 830 e.g., request messages and process the received messages by location processor 300. At step 906, the location processor 300 is configured to identify the mobile device and the position of the mobile device based on data included in the Wi-Fi message. The Wi-Fi message may comprise one or more of the SSID, MAC address signal strength indicator, or signal strength value or signal strength measure (RSSI) and connection status. The Wi-Fi message 830 may include location information. The SSID and/or MAC address may be used to identify the mobile device. The position of the mobile device 110 may be identified based on the signal strength. The location of the mobile device may be identified based on location information included or stored within the Wi-Fi message.

The rescue application 820 may be downloaded and installed on the personal mobile device 110. The rescue application 820 may be configured to operate one or more of: a Wi-Fi module of the mobile device, a hotspot function of the mobile device and optionally a location process such as satellite navigation system of the mobile device to gather location information (e.g., coordinates) of the mobile device. The mobile device 110 is configured to provide one or more messages to the Wi-Fi access point device 210 to facilitate rescue of the distressed person.

In one example, the rescue application may be configured to operate an appropriate Wi-Fi technology in the mobile device. Various types of mobile devices may include different technologies e.g., APIs that trigger Wi-Fi messages. In one example, the mobile device may call an Android API Wi-Fi Scan. This API will trigger the mobile devices Wi-Fi manager (i.e., Wi-Fi module) to send the Wi-Fi messages. In another example, the mobile device may call an Android API Wi-Fi Connect. Calling this API will trigger the Wi-Fi manager of the mobile device to send Wi-Fi messages. In another example, the Android API On/Off may be activated to trigger activation of the Wi-Fi module. The mobile device of other manufacturers, e.g., Apple, OPPO etc may have other appropriate APIs or Wi-Fi technologies.

Figure 10:
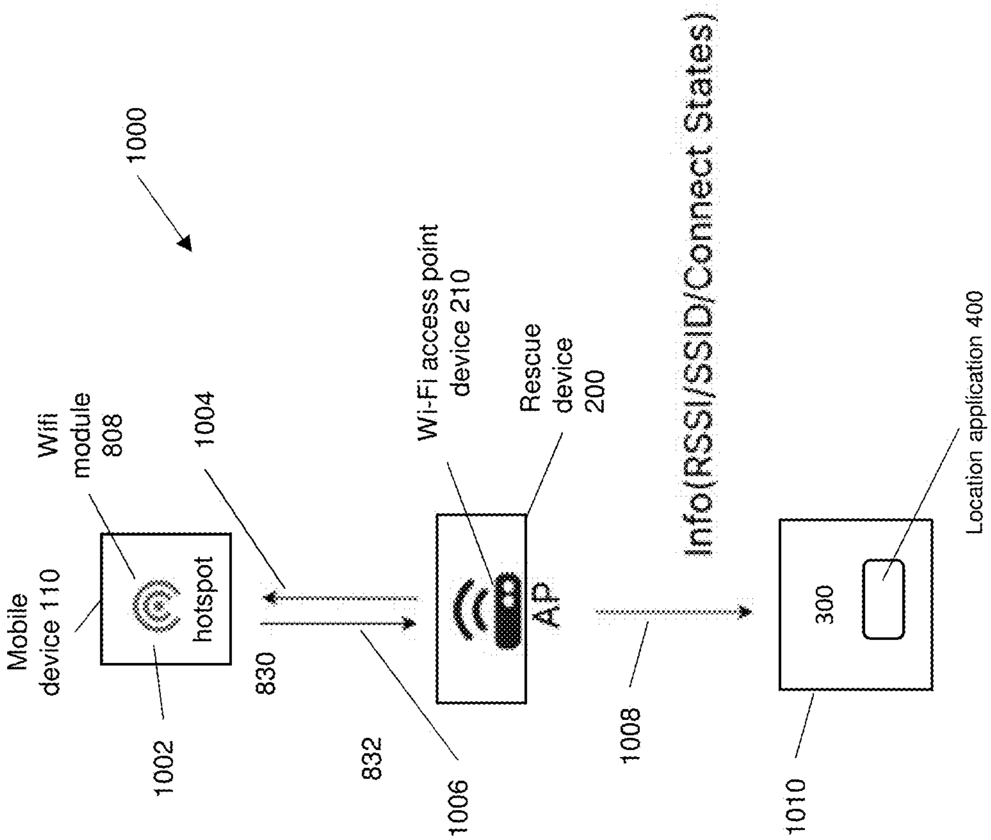
FIG. 10 illustrates an example operation of the rescue device and the mobile device when hotspot function is enabled.

FIG. 10 illustrates another example operation mode to wirelessly connect the mobile device 110 with one or more access point devices. FIG. 10 illustrates an operation using the hotspot function of the mobile device 110. Referring to FIG. 10, at step 1002 the hotspot function is activated to establish a Wi-Fi network. In one example the rescue application 820 is configured to activate a hotspot function of the mobile device 110 to establish a Wi-Fi network. The Wi-Fi access point device 210, within a rescue device 100, is configured to detect the Wi-Fi network established by the hotspot of the mobile device 110. The access point device 210 may establish a connection via the Wi-Fi network from the hotspot.

In the illustrated example, at step 1004 the access point device 210 may transmit a Wi-Fi message 830 (e.g., a wireless message) to explore an area for available networks. In the example of FIG. 10, the Wi-Fi message may be a connection request transmitted from the access point device 210 (i.e., in the rescue device 100) to connect with the mobile device, when a hotspot is detected.

At step 1006 the mobile device is configured to transmit a response 832 in response to receiving the connection request 830 (i.e., Wi-Fi message 830) from the Wi-Fi access point device 210. The Wi-Fi access point device is configured to receive a response from the mobile device hotspot. The response from the mobile device 110 may include information related to the mobile device. Step 1008 comprises the Wi-Fi access point device 210 configured to transmit the received Wi-Fi message or the information to the location processor 300. At step 1010 the location processor 300 is configured to process the information or Wi-Fi message to identify the mobile device and position of the mobile device to facilitate rescue of the distressed person associated with the mobile device.

The Wi-Fi message from the mobile device 110 may comprise at least the SSID, RSSI information, MAC address, signal strength information and device connection status. The included information i.e., info shown in FIG. 10 is transmitted to the location processor. The location processor 300 is configured identify the mobile device based on the SSID or MAC address and determine the position of the mobile device based on relative signal strength. The position can be determined as the signal strength increases.

When the hotspot function is activated as shown in FIG. 10, the mobile device may function as an access point (i.e., a network access point). The rescue devices 200 may act as a Wi-Fi scanner to explore the nearby networks. The rescue devices may transmit Wi-Fi messages to locate the mobile device i.e., the access point that has generated the network via hotspot.

The rescue application 820 may automatically activate the hotspot function of the distressed person's mobile device 110. The rescue application 820 is advantageous because it automatically activates the hotspot function. If the hotspot function is forcibly switched off, then the rescue application 820 is configured to reactivate the hotspot. The rescue application 820 is advantageous because the app 820 prevents the hotspot from being disabled. The hotspot function being constantly turned on is advantageous because in the hotspot function remains constantly on and thereby making it easier to discover the distressed person. The rescue application 820 in maintaining the hotspot on improves the chances of successfully locating the distressed person. Optionally, a user may manually activate a hotspot function of the mobile device 110.

Figure 11:
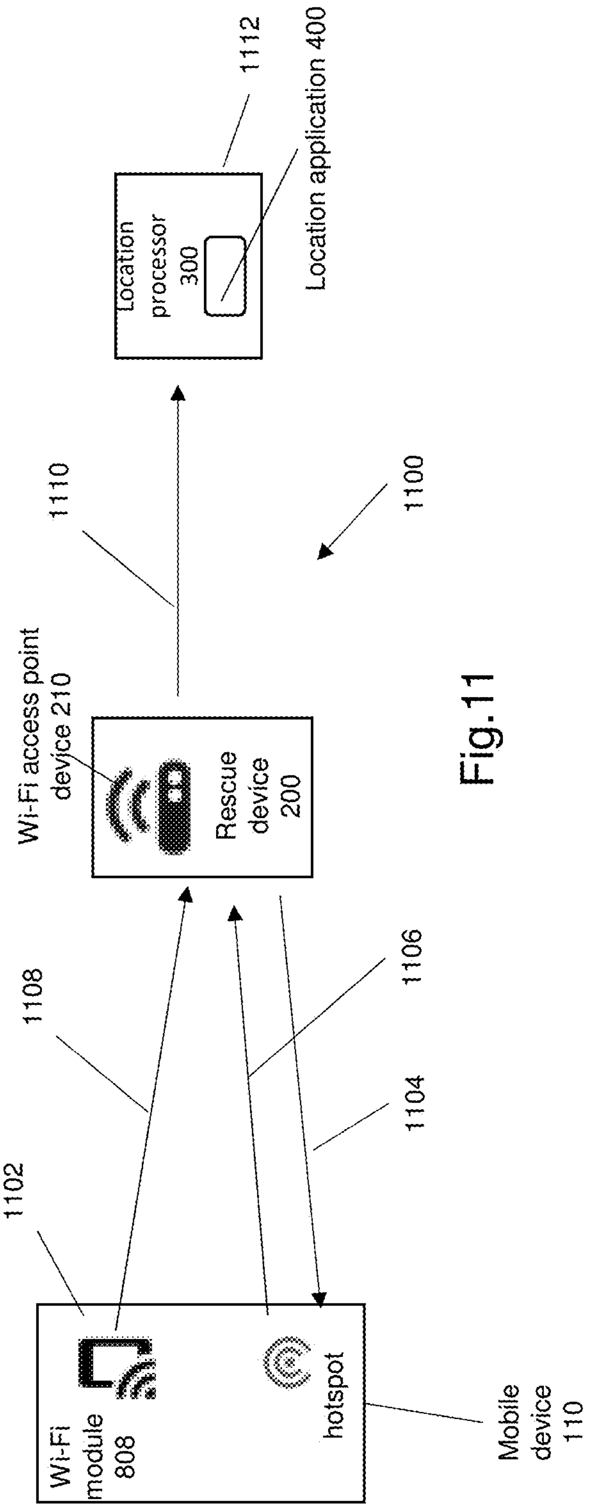
FIG. 11 illustrates an example operation of the rescue device and the mobile device when the Wi-Fi module and hotspot are being used.

FIG. 11 illustrates a workflow of another example operational mode 1100 where hotspot and Wi-Fi. The mobile device may activate both functions simultaneously or may cycle between the two functions. Referring to FIG. 11, at step 1102 the rescue application 820 is configured to activate the hotspot function. The Wi-Fi module may also be activated simultaneously. The hotspot function and Wi-Fi module may be activated at the same time or they may be consecutively activated or cycled. Optionally, the hotspot function may be activated as soon as the rescue application 820 is downloaded. In a further alternative, the user may manually activate the hotspot, like FIG. 10.

At step 1104, the Wi-Fi access point device 210 is configured to transmit a wireless message, which for example, may include a probe a request or a request message, or any other messages to explore an area for available networks. At step 1106, the Wi-Fi access point device 210 is configured to receive a response from the mobile device hotspot in response to the mobile device receiving the wireless message e.g., a probe request from the Wi-Fi access point device 210. The response message from the mobile device may include information related to the mobile device 110. The information may include, for example, SSID, MAC address, signal strength or other information.

At step 1108, the Wi-Fi module 820 (e.g., the Wi-Fi scanner 822) may be configured to scan a local area for an available Wi-Fi network by transmitting one or more wireless messages e.g., connection requests or probe requests. The Wi-Fi access point device 210 is configured to receive the wireless message. At step 1110, the Wi-Fi access point device 210 transmits data to the location processor. The data includes information related to the mobile device received in the probe request from the Wi-Fi scanner and information related to the mobile device within the probe response from the hotspot.

At step 1112, the location processor 300 is configured to process the information related to the mobile device to identify the mobile device and the position of the mobile device, to facilitate rescue of the distressed person associated with the mobile device. The location processor 300 may be configured to receive the response message and process the response message to identify the mobile device based on the SSID or MAC address included or stored within the probe response and determine a position of the mobile device relative to the rescue device based on the signal strength indicator included or stored in the probe response.

The mobile device may operate in any or more of the operational modes as shown in FIGS. 9 to 11. The mobile device may cycle through each of the modes of FIG. 9, FIG. 10 and FIG. 11. For example, the mobile device may be configured, by the rescue application to operate in any one mode as shown in FIG. 9, 10 or 11. In one example, the mobile device 110 may cycle through each mode of operation. For example, the rescue application 820 may be configured to activate the Wi-Fi module or Wi-Fi scanner, then activate hotspot and cycle and then activate both. The rescue application may control the mobile device to cycle through each mode of operation and select the most appropriate mode of operation i.e., select the mode appropriate manner to operate to facilitate rescue. The specific mode of operation may be dependent on the type of phone (e.g., make and model) or type of Wi-Fi module onboard or the signal availability etc.

In one example when the Wi-Fi module 808 is turned on e.g., as shown in FIG. 9, the wireless messages may be automatically transmitted by the mobile device at regular intervals e.g., every 10 min-20 min. In the example of FIG. 11 when the hotspot and Wi-Fi module are activated wireless messages may be transmitted more frequently e.g., every 30 s to 1 min. In the example of FIG. 10, the hotspot of the mobile device may be activated. The rescue device may transmit wireless messages at regular intervals (e.g., every 40 s to 1 min) to connect to the mobile device hotspot.

The mobile device 110 may optionally be able to connect to a satellite navigation system (e.g. BeiDou, GPS system, GLONASS etc) or obtain other user information to access a location, approximate location or other user device information of the mobile device. The mobile device 110 may wirelessly couple e.g., handshake with one or more of the access point devices 210. The location information or user information, including satellite navigation system coordinates (if available) or other location information may be transmitted to the rescue device from the mobile device once the mobile device forms wireless link with the rescue device. The location information or user information may in turn be transmitted from the rescue device to the location processor 300. The location information or user information may be used to pin point the position of the victim based on the location or user information of the mobile device 110.

As described earlier, location information may be incorporated into Wi-Fi messages. The mobile device may activate an appropriate technology to incorporate some location information, e.g. an Android API Get Location. This API may trigger the Wi-Fi manager e.g., the Wi-Fi module 808 to incorporate location information into Wi-Fi messages. Other appropriate APIs may be used in the operational modes shown in FIGS. 8 to 10.

Optionally the rescue system 100 may comprise a plurality of rescue devices 202-206. Each rescue device comprises a Wi-Fi access point device. Optionally, at least one Wi-Fi access point device of a first rescue device 202 is configured to detect a hotspot of the mobile device, and, when available, at least one other Wi-Fi access point device of the second or subsequent mobile device 204 is configured to communicate with a Wi-Fi scanner of the mobile device. Accordingly, the rescue system 100 may use a single rescue device or multiple devices 202-206 as based on the circumstances of the rescue attempt and/or the deployment of rescue resources during the rescue mission.

In one example, the victim can use one or more trigger Wi-Fi message technologies. In one example, one or more rescue devices (including an access point device) can be configured to scan for devices in nearby hotspots. The one or more rescue devices can be configured to receive Wi-Fi messages (i.e., wireless messages) from nearby devices. Each Wi-Fi message may include basic information about Wi-Fi from a mobile device. The location processor may be configured to receive Wi-Fi message information collected by the rescue devices and transmitted by the rescue devices. The location processor may estimate the approximate position of the mobile device based on the contents of data extracted from the Wi-Fi messages. One or more rescue agency computing systems may be configured to receive information processed by the one or more rescue location processor. location information, user personal information etc. may be received at the rescue agency computing systems. This information may be received when the mobile device 110 has an available network. The precise position of the mobile device may be determined at the rescue location processor.

The location application 400 allows visualisation of rescue information including calculating and displaying the estimated location of the rescue target i.e., the distressed person. The location application 400 being executed by the location processor 300 allows the identity and position of the mobile device to be determined and hence the estimated location of the distressed person is also determined.

Figure 12B:
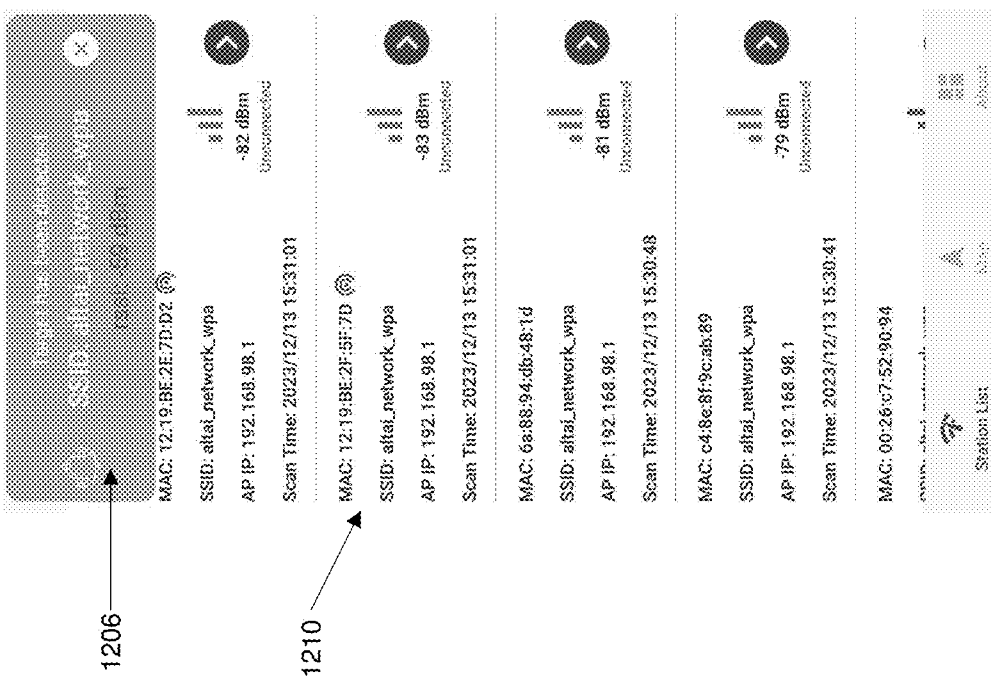
FIG. 12B illustrates an interface where a mobile device has been detected and a connection has been formed.
Figure 12A:
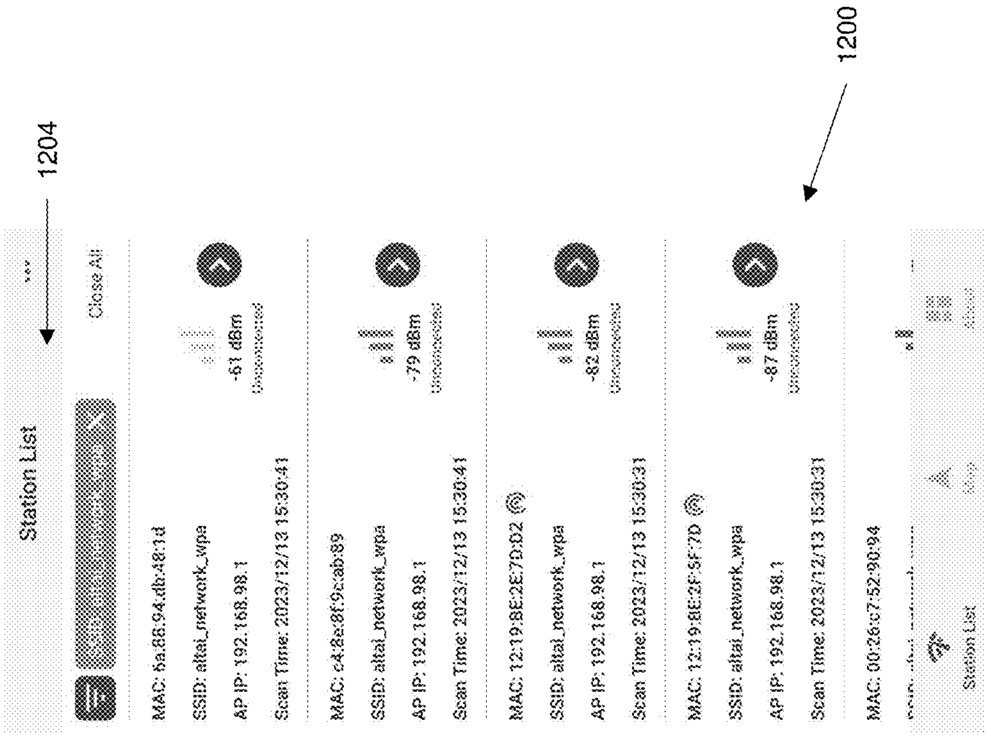
FIG. 12A illustrates an interface illustrating multiple rescue devices with access points with no connection

FIG. 12A and FIG. 12B illustrate a visualisation of rescue information. FIG. 12A illustrates an interface 1200 that shows an interface 1200 that may be displayed at the rescue computing system 310. The interface displays multiple rescue devices and their connection status. The interface 1200 displays each access point device of each rescue device and its connection status. As shown in FIG. 12A in interface 1200 there is no mobile device detected, and each access point is unconnected, as shown in the ribbon 1204. Ribbon 1204 illustrates no connection.

FIG. 12B illustrates a second interface 1210. The interface 1210 indicated that at least one rescue device (i.e., access point device) has connected to a mobile device. This status is shown in the ribbon 1206. Ribbon 1206 displays a target has been detected and an SSID of the network has been formed. An RSSI i.e., signal strength value is also shown. The ribbon 1204, 1206 may be a virtual ribbon or an area of the display.

The displays 1200, 1210 may be displayed on the rescue computing system 310 or may be presented on each rescue device. In another example, the display 1200, 1210 may be presented on a smartphone or table of each rescue person that is scanning for a missing person. In one example, an interface like 1210 may be presented on the mobile device 110 of the victim (e.g., missing person) if a Wi-Fi connection is formed with a rescue device.

The location application 400 is configured to control the location processor 300 to generate or access a map of a search area. The application 400 is further configured to determine a location of the rescue device 200 based on transmitted location information of the rescue device. Optionally, the location application 400 may be equipped with an offline map function when there is no network available. If network is available, the location application 400 may be configured to control the location processor 300 to communicate with a satellite positioning system and generate a map of a search area. The data received from the mobile device can be stored in a database within the location processor or in a database in a rescue agency computing system.

The location application 400 may be configured to cause the location processor 300 to calculate a rescue path to the determined location of the mobile device (i.e., the determine location of the distressed person). The location application 400 is further configured to plot the rescue path on the map. The map and rescue path may be presented on a user interface of the rescue device 200. Optionally, the location application 400 may be configured to operate the location processor to present the location of the rescue device and the mobile device and movement of the rescue device along the rescue path.

The system 100 may comprise multiple rescue devices 202-206. The location application 400 is configured to cause the location processor 300 to collect information from the multiple rescue devices 202-206. The location application 400 may have a multi access point mode, which processed the information collected from all the Wi-Fi access point devices of each rescue device. The location application 400 may cause the location processor 300 to determine multiple rescue routes to an estimated location of the mobile device (and distressed person). The location processor 300 may be configured to calculate a route from each rescue device to the estimated location of the mobile device. The location application 400 may cause the processor 300 to determine the optimal rescue route and present the routes or optimal route onto the user interface. The optimal route or routes is also calculated based on terrain information.

Figure 13:
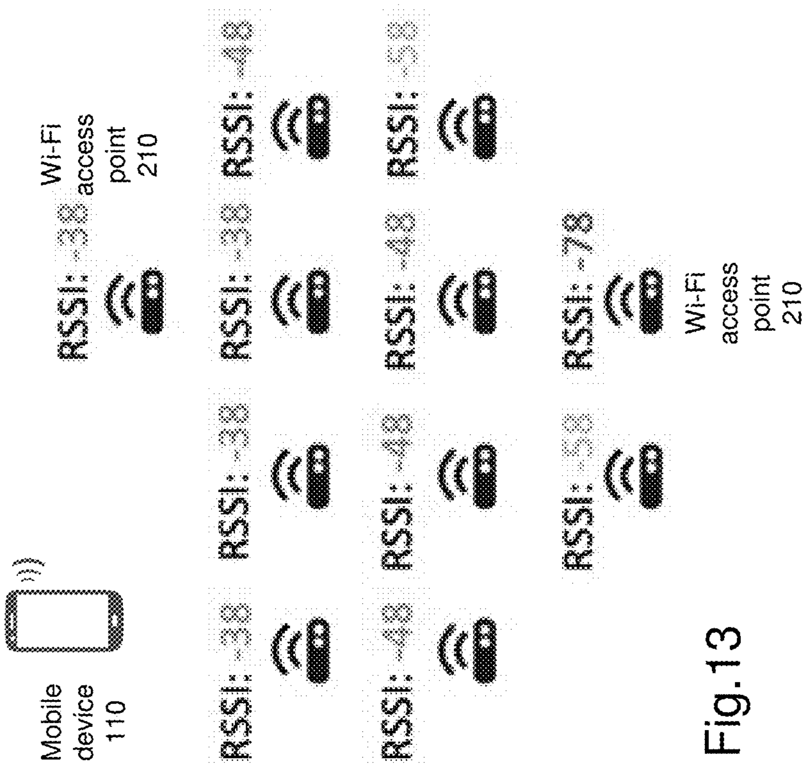
FIG. 13 illustrates an example of the rescue system including multiple rescue devices each with a Wi-Fi access point device and the relative signal strength of the Wi-Fi access point and the mobile device.

The location processor 300 may be further configured to obtain information from each Wi-Fi access point 210 and is stored in a database. The data is processed to determine whether there is any rescue target i.e., a distressed person based on the SSID. Further the distance of the Wi-Fi access point 210 in relation to a rescue target based on the signal strength i.e., RSSI strength. FIG. 13 illustrates an example of the system 100 including multiple Wi-Fi access point devices. The signal strength i.e., RSSI strength detected at each access point device and mobile device is shown. The signal strength is calculated by the location processor 300 based on information included or stored in the Wi-Fi messages (i.e., probe requests or probe responses). Referring to FIG. 13, the closest Wi-Fi access points have an RSSI value of −38 indicated in green. The furthest away access point has an RSSI value of −78. The other RSSI values show the relative signal strength which is indicative of the distance from the mobile device of the distressed person and each Wi-Fi access point. The RSSI value may be displayed on the user interface of each rescue device. This allows the rescue operator to determine the relative distance between the rescue device 200 and the mobile device 110.

The rescue device 202-206 is configured to generate an alert if a mobile device is detected, wherein the alert may be one more of: an audible alert, a visual alert, a haptic alert or vibrational alert. The alert is generated when a distressed person is detected. The alert may cause the rescue device to vibrate may the rescue device 202-206 wirelessly couples i.e., exchanges messages with a mobile device associated with a distressed person. The vibration may indicate that the current detected mobile device belongs to a distressed person in need of rescue.

The specific distressed person and associated mobile device may be determined if the SSID of the mobile device matches the SSID of a missing person. A missing person report may be filed with a rescue agency that includes a mobile number, and the SSID can be accessed from based on the mobile number e.g., from a telecommunications provider. In some instances, a distressed person may be identified if an identified mobile device within an area has not moved or is moving very slowly.

Alternatively, if a detected mobile device is still within a valley or within a crevice etc. These situations may be indicative of a distressed person. In these situations, a rescue agency may regularly scan areas where people get lost or regularly scan commonly used hiking tracks or other commonly used outdoor activities. If a detected mobile device is stationary for an abnormally long period of time e.g., over several hours, then an alert is generated. Alternatively, or in combination, if there is any specific commands, such as voice or text or other inputs from the mobile device that may indicate distress or request for assistance, or the possibility that a person has suffered a fall as detected by IMU data on the mobile device, then these events may be processed and determined if there is a mobile device which has issued a distressed signal, indicating that there is a distressed person. If the mobile device is identified as belonging to a distressed person, then the rescue device 200 may be configured to display a rescue message e.g., a "rescue target person" on the user interface. The message may be a text message, or the lights may be illuminated to indicate a target requires rescue.

The rescue device 200-206 is a portable rescue device capable of being carried by a rescue operator or mounted on a rescue vehicle. The location processor 300 is configured to calculate a search path for each rescue device within the search area. The search path may be any one or more of: a parallel track search pattern, a sector search pattern, an expanding search pattern. The location processor 300 may be configured to: track the position of each rescue device on the search path and track the position of each rescue device relative to other rescue devices. The search path of each rescue device, the position of each rescue device on the search path and the position of each rescue device relative to the other rescue devices may be presented on user interface of the rescue device.

Figure 14:
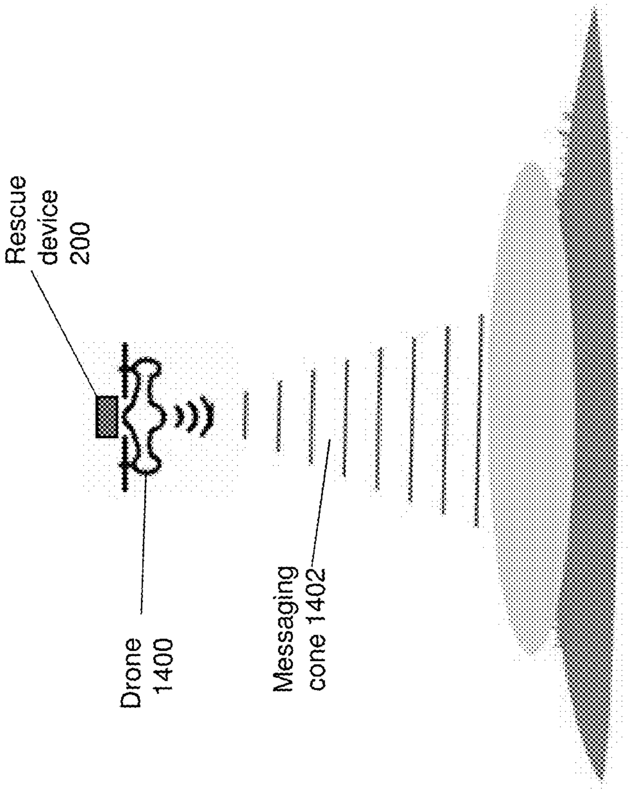
FIG. 14 illustrates an example of the rescue device being mounted on a drone and a messaging cone being transmitted from the rescue device.

FIG. 14 illustrates an example of the rescue device 200 being mounted on a drone 1400 or another flying vehicle e.g., a helicopter. The rescue device may be mounted on a flying vehicle or may be held by a rescue operator within a flying vehicle e.g., a helicopter. Additionally, the rescue device may be mounted on a land-based vehicle like a jeep. The rescue device 200 may operate in a cruise mode. Cruise mode may be manually or automatically engaged. In cruise mode can be used to increase the efficiency of the rescue on specific rescue routes. As shown in FIG. 14, the wireless messaging cone 1402 is illustrated. The messaging cone 1402 is the area in which the Wi-Fi access point device 210 can transmit and receive wireless messages from the mobile device. Similarly, when a distressed person i.e., rescue target is identified other alerts may be generated by the rescue device.

Figure 15:
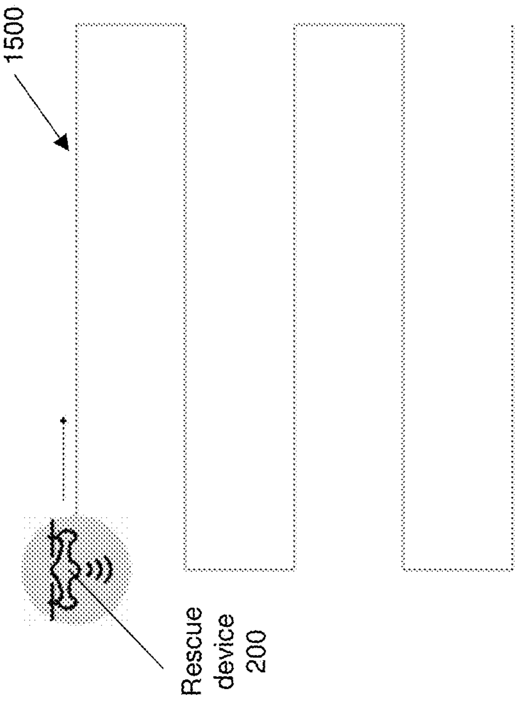
FIG. 15 illustrates an example of a parallel track search pattern of a single drone with a mounted rescue device.
Figure 16:
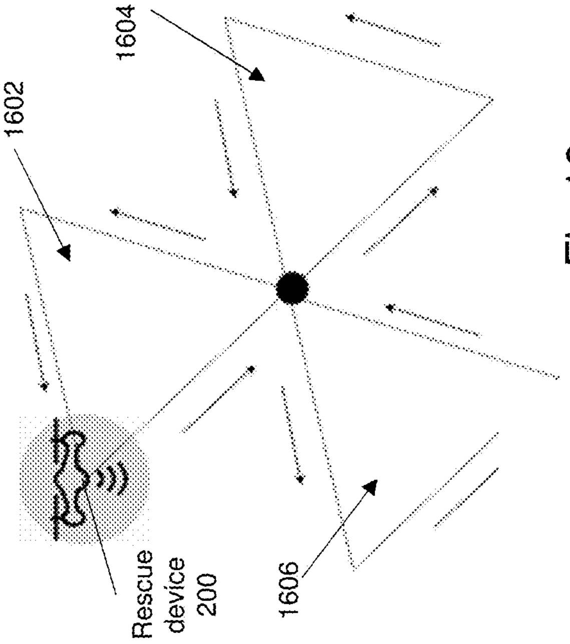
FIG. 16 illustrates an example of sector search pattern that is followed by a vehicle with a single rescue device mounted on it.
Figure 17:
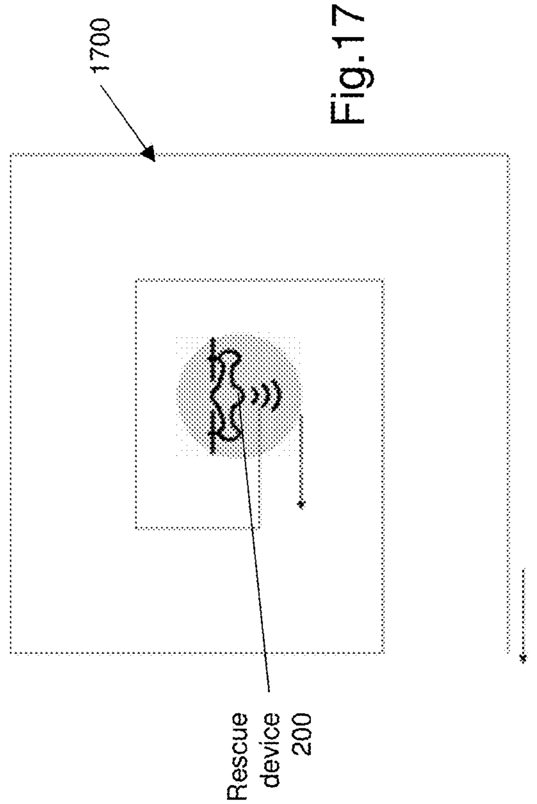
FIG. 17 illustrates an example of an expanding square search pattern.

FIG. 15 illustrates an example of a parallel track search pattern 1500, for a single rescue device 200 mounted on a vehicle. The parallel track search pattern 1500 is a search pattern that is used by a single rescue device mounted on a vehicle to locate a distressed person in a search area. FIG. 16 illustrates an example of sector search pattern 1600 that is followed by a vehicle with a single rescue device 200 mounted on it. The sector search pattern includes dividing a search area into sectors 1602, 1604, 1606. The drone mounted (i.e., vehicle mounted) rescue device is moved through triangular or other shaped sectors within a search area to try and locate the distressed person. FIG. 17 illustrates an example of an expanding square search pattern 1700. The expanding square search pattern is a further alternative search pattern.

Figure 19:
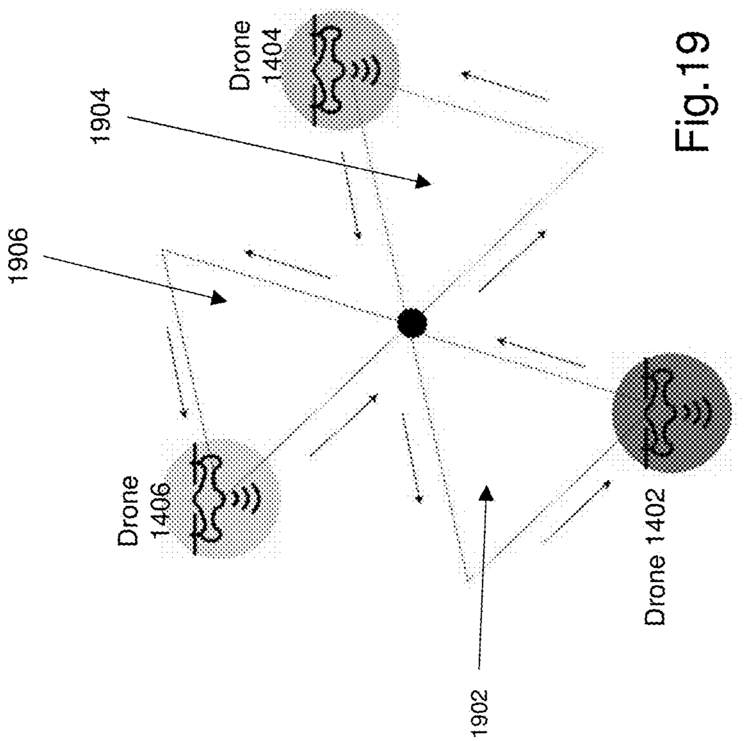
FIG. 19 illustrates a sector search pattern for multiple vehicles, each vehicle with a rescue device mounted thereon.
Figure 18:
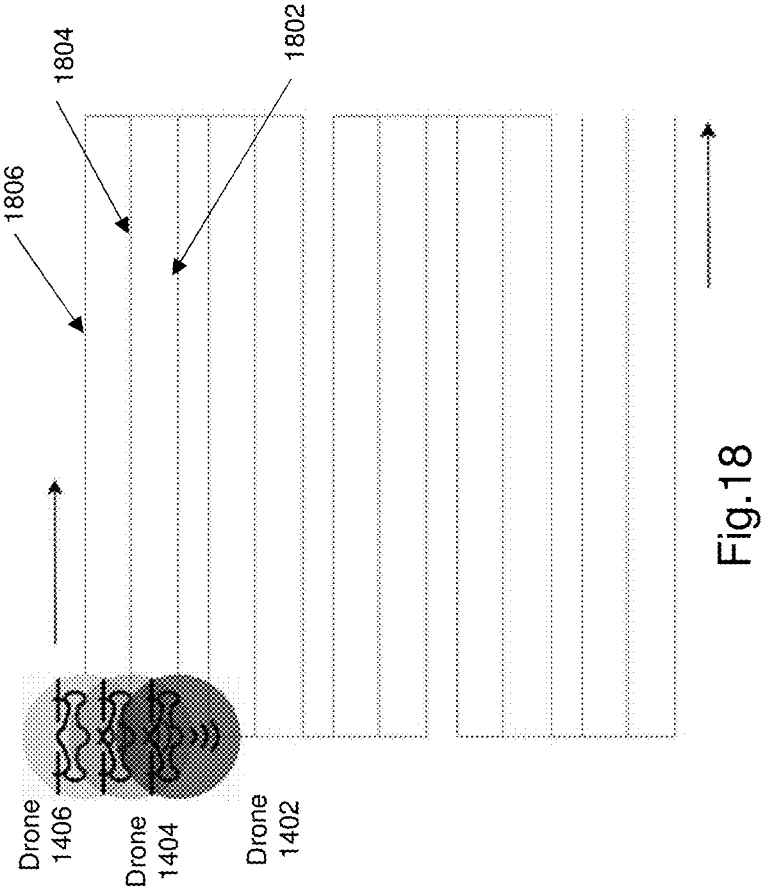
FIG. 18 illustrates an example of a parallel track search pattern with multiple drones each drone including a rescue device.

FIGS. 18 and 19 illustrate cruise routes of multiple vehicles (i.e., multiple rescue devices) moving around a search area. Each vehicle may include one rescue device mounted on it. FIG. 18 illustrates an example of a parallel track search pattern 1800. Each vehicle 1402, 1404, 1406 e.g., a drone with a mounted rescue device may be controlled to move in linear paths 1802, 1804, 1806 that are parallel to each other. FIG. 19 illustrates a sector search pattern for multiple vehicles e.g., drones 1402, 1404, 1406. The search area is divided into multiple sectors 1902, 1904, 1906. Each vehicle moves around a single sector. The sector search pattern may be triangular or any other suitable shape.

Figure 20:
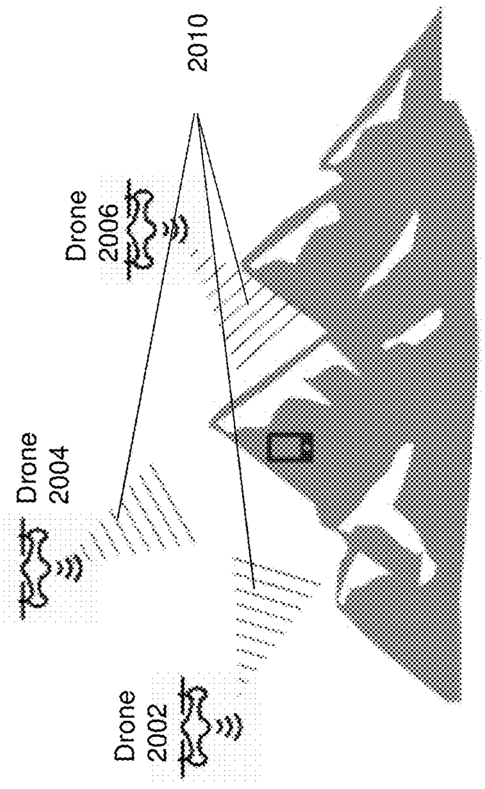
FIG. 20 illustrates the wireless messages being transmitted between the rescue device on each drone and the mobile device to locate the mobile device.
Figure 21:
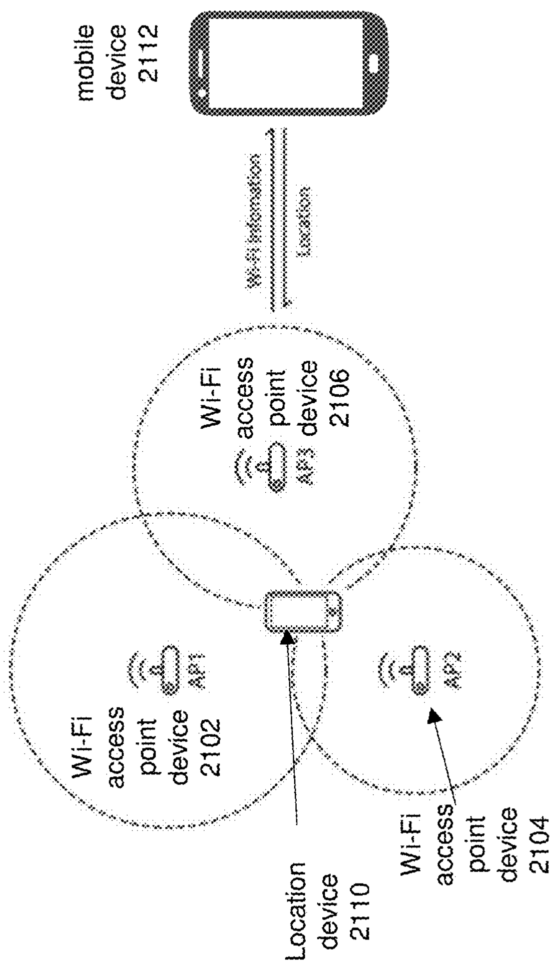
FIG. 21 illustrates multiple Wi-Fi access point devices communicating with a location processor implemented in a location device.

FIGS. 20 and 21 illustrate an example of how the position of the personal mobile device 110 and associated distressed person can be detected using multiple rescue devices (and multiple Wi-Fi access point devices). FIG. 20 illustrates an example of three drones 2002, 2004, 2006, and each drone includes a rescue device. FIG. 20 illustrates the wireless messages 2010 being transmitted between the rescue device on each drone and the mobile device. The location information may be calculated based on information included or stored in the wireless messages and displayed on a map generated and displayed on a user interface of a rescue agency computing system. In FIG. 20, a spot mode of rescue device on each drone 2002-2006 can be used to explore long distances and each rescue device may be used to conduct a wide range of searches to determine the location of the rescue target (i.e., a distressed person).

FIG. 21 illustrates an example of the system 100 with multiple access point devices 2102-2106. FIG. 21 illustrates multiple Wi-Fi access point devices 2102, 2104, 2106 communicating with a location processor 300 implemented in a location device 2110. The location device 2110 may be a computing device e.g., a tablet or laptop and operated by a rescue operator. As shown in FIG. 21, each Wi-Fi access point device 2102-2106 may communicate with the location device 2110. The location device 2110 may calculate the identity of the mobile device 2112 and the position of the mobile device based on the wireless messages received by the Wi-Fi access point devices.

FIG. 13, FIG. 20 and FIG. 21 illustrate a rescue system 100 that comprises multiple rescue devices. Each rescue device may comprise an access point. The system may comprise multiple access point devices. The access point device of each rescue device may be controlled through the rescue location processor or the rescue agency computing system, as shown in FIG. 1. In this example, the rescue agency computing system may comprise the location processor. The multiple access point devices may also communicate with each other. In an alternative configuration, each access point device may be controlled by a single location processor, as shown in FIG. 3. The rescue devices may communicate with each other.

In a multi access point use configuration e.g., FIG. 13, FIG. 21, the multiple access point devices are configured to explore Wi-Fi messages at the same time. Each rescue device may comprise a single access point device The access points may be configured to operate in a multiple access point mode. In this mode, information may be shared amongst the other access point devices. In this multi access point mode, the access points may form a mesh network. In an alternative form each rescue device may comprise multiple access point devices.

The Wi-Fi messages that are exchanged between the mobile device and one or more access point devices may be shared among the multiple access point devices. For example, if one access point device receives a Wi-Fi message from a victim device (i.e., mobile device), that access point device may transmit this information to the other access point devices. The multiple access points information may also be shared and transmitted back to the location processor 300 and the rescue system computing system 310. The shared information e.g., relative RSSI values or location information can be used to calculate a position of the mobile device accurately. One example, is illustrated in FIG. 13, where relative RSSI values are calculated and processed. In the example of FIG. 13, the RSSI values from each access point device may be transmitted or shared amongst the other access point devices in order to determine the approximate position of the mobile device based on the relative RSSI values. As shown in FIG. 13, each access point device may be part of a rescue device like the device shown in FIG. 3 or FIG. 5-7.

Figure 22:
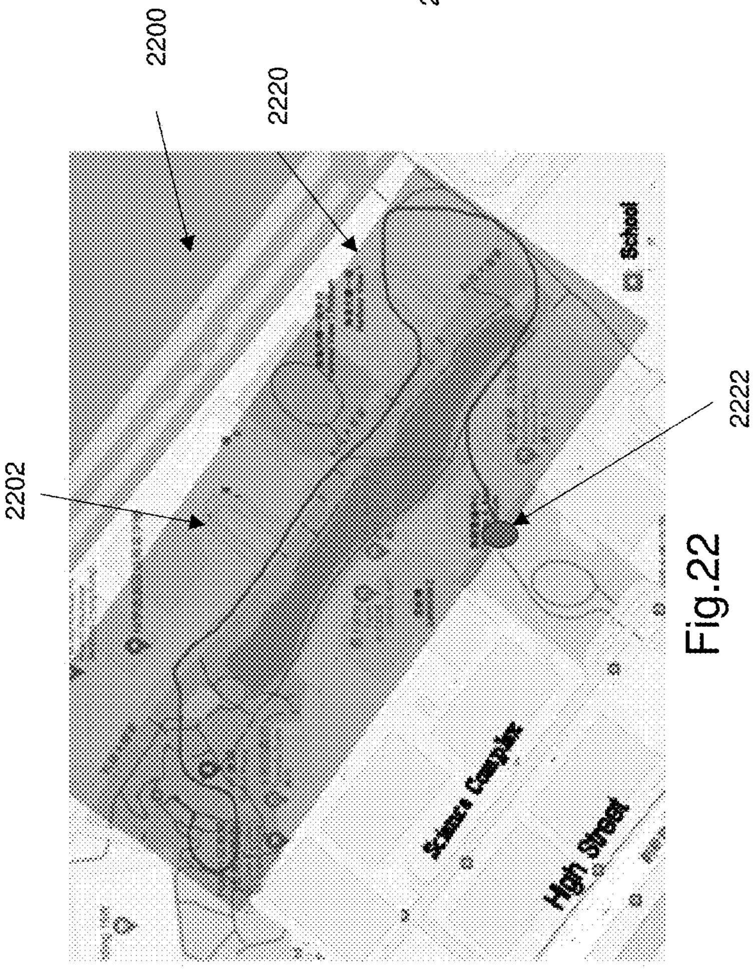
FIG. 22 illustrates a map with a rescue footprint.

FIG. 22 illustrates a footprint view 2200. The footprint view 2200 may be generated at the location processor 300 and may be displayed on the rescue system computing system 310. The footprint view 2200 may also be displayed on a screen of each rescue device 200 (e.g., 202, 204, 206). The footprint view 2200 of FIG. 22 may be calculated based on one or more rescue devices 200 and access point devices 210 locating a hotspot of a victim mobile device 110. Hotspot may be located based on an exchange of Wi-Fi messages and/or other wireless messages between the rescue device (in particular the access point device) and the victim mobile device 110. The Wi-Fi messages may include location information too. The location processor 300 may receive data from the access point device (or devices) 210 and determine a search footprint. The search footprint may be determined based on data from the received Wi-Fi messages, e.g., RSSI values or location information. The footprint interface 2200 illustrates a rectangular search footprint 2202 that may be determined based on a signal strength value (RSSI) of a detected hotspot. The footprint 2202 indicates the possible area the mobile device 110 and the victim are likely to be within based on the signal strength detected.

Figure 23:
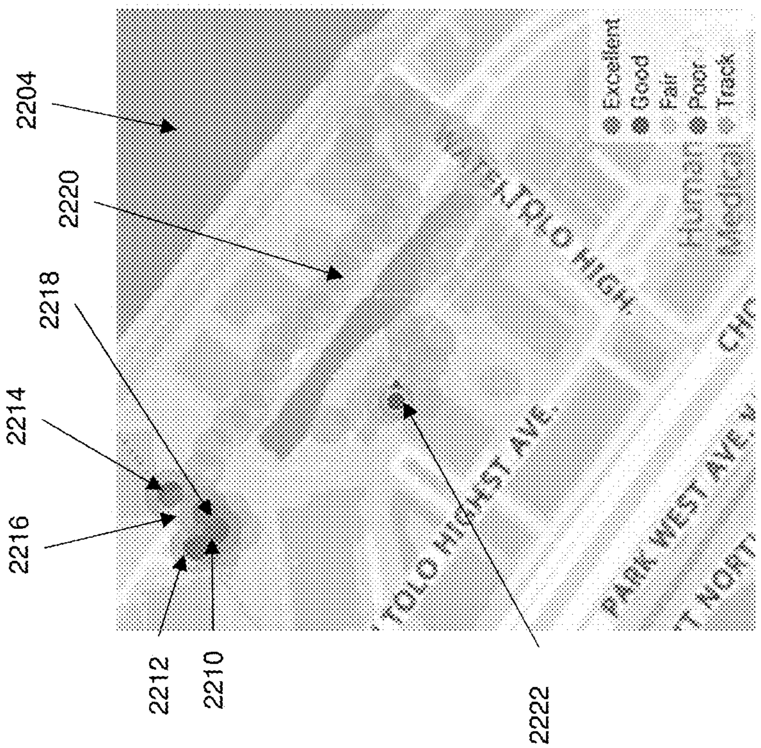
FIG. 23 illustrates a view with relative signal strengths of the connection with the mobile device and rescue device.

FIG. 23 illustrates signal strength details 2204 that may be presented on the footprint view 2200. The signal strength detected at various points (or by various access point devices) is shown. Each dot may on the interface 2200 may be indicative of a signal strength measurement by one access point device as a rescuer moves along a search path. Each dot may alternatively, illustrate the signal strength determined by the multiple access point devices. The dots 2210, 2212, 2214 indicate a very poor signal strength. Dot 2216 indicates a fair signal strength. Dot 2218 indicates a strong signal strength. The dot 2218 may indicate a position where a strong signal from the mobile device 110 (i.e., victim device) is detected. The signal strength may be colour coded to indicate to rescuers if they are getting closer to the victim.

A rescue path 2220 may be calculated to explore the footprint 2202. The path 2220 may be predetermined. The path 2220 may be calculated by the location processor 300. The path 2220 may indicate an efficient search route to search the footprint 2202. Alternatively, the path 2220 may indicate a path to the victim based on a calculated location of the victim. The location of the victim may be calculated based on BeiDou, GPS, GLONASS or other satellite navigation system's information or other location information included or stored in Wi-Fi messages. The dot 2222 on the map in FIG. 22 and FIG. 23 may be indicative of the victim position. The rescue path 2220 may be calculated at the location processor 300 or at the rescue device computing system 310. The rescue path 2220 may indicate the most efficient path to the victim. The location processor 300 or rescue device computing system 310 may also consider the terrain by access a map of the rescue footprint 2202 from a satellite navigation system or a map system. The rescue path 2220 may avoid any dangerous terrain where possible. The footprint view 2200 and the rescue path 2220 help to guide rescuers to the victim. The rescue path 2220 may also be presented on any map view illustrating the position of the victim and a path to reach the victim.

The rescue system as described may be used to facilitate rescue in any condition. For example, the rescue system 100 may be used to facilitate ground area rescues or mountain area rescues (e.g., FIG. 20), or in another environment such as forest rescue, sea rescue etc. For ground rescue, rescuers may be equipped with rescue devices. Multiple rescuers may each be equipped with a rescue device including an access point device. Wi-Fi messages may be captured from a victim mobile device or the mobile device may actively explore and auto connect to one or more access point devices e.g., based on the SSID. Optionally, a positioning reference, including Beidou, GPS, GLONASS or other satellite navigation system's coordinates may be captured and a rescue path may be plotted. In a mountain rescue situation, one or more helicopters or drones may be equipped with a rescue device having an access point device. The victim mobile device is detected based on the exchange of Wi-Fi messages or by detecting a hotspot. Optionally, Beidou, GPS, GLONASS or other satellite navigation system's coordinates of the victim device may be captured and a rescue path may be plotted to the victim.

The rescue system 100 as described herein has been described in relation to facilitating rescue of a single distressed person. The rescue system 100 as described herein may be used to rescue multiple distressed persons. The rescue system 100 may include multiple rescue devices that can communicate with a remote rescue system e.g., a rescue agency computing system. The rescue system 100 may further comprise multiple rescue agency computing systems that may communicate with each other and the rescue devices in the field. Each of the multiple rescue agency computing systems may implement the location application. The rescue system 100 may be scalable in size. For example, multiple rescue devices may be added or removed from the system and additional rescue agency computing systems may be added or removed from the system.

The example embodiments of the rescue system 100 are described in reference to one or more rescue devices 202-206 configured to communicate with a single personal mobile device 110 of a distressed person. The rescue system 100 may be used to locate multiple distressed persons and facilitate their rescue. Each rescue device 202-206 may be configured to communicate with multiple personal mobile devices.

The rescue system 100 as described herein can be used by multiple rescue agencies to facilitate faster, more efficient rescue of distressed persons. The rescue system 100 as described herein can reduce the manpower (i.e., labour) requirements and costs. The rescue system 100 and the use of rescue devices further provides improved accuracy and reliability as the system uses wireless communications, in particular Wi-Fi communications between mobile devices and rescue devices. The rescue system 100 is advantageous because it leverages the use of Wi-Fi messages and a Wi-Fi network rather than relying on satellite positioning location or access to cellular data. In remote environments, a distressed person often does not have access to satellite navigation system or cellular data. The use of rescue devices with a Wi-Fi access point is advantageous as the system uses Wi-Fi signals (e.g., probe requests and probe responses) transmitted between the personal mobile device and the rescue devices to locate the distressed person. The rescue device including a Wi-Fi access point is advantageous as the access point transmits beacon frames to advertise the Wi-Fi network established and available by the rescue device. If available, then satellite positioning and cellular data is used in addition to the Wi-Fi signals to further improve accuracy of determining the location of the personal mobile device and the user.

The rescue system 100 and rescue devices described herein use Wi-Fi due to the ubiquitous nature of the Wi-Fi network and Wi-Fi standards. However, the rescue devices may be equipped with appropriate hardware to establish other wireless networks such as LPWAN or Zigbee or Z-wave or Bluetooth. The rescue system 100 may be configured to operate with any alternative wireless networks such as LPWAN or Zigbee or Z-wave or Bluetooth.

The use of the access point hardware as part of the rescue system 100 allows a Wi-Fi network to established and wireless messages to be exchanged in remote areas where there may not be any cellular network available. The Wi-Fi messages (i.e., wireless messages) such as probe requests and probe responses can be used to identify the rescue target (i.e., the distressed person) and the position of the that person based on determining the position of their mobile device. The rescue application as described is advantageous as it activates the Wi-Fi functionality of the mobile device. The rescue application may also activate other wireless networking modules. The rescue application can be selected to operate in multiple modes depending on the services that are available e.g., cellular data or satellite positioning systems. Further the rescue application maintains at least one function e.g., the hotspot function of the Wi-Fi scanner active in order to be able to communicate with a rescue device that may arrive in its vicinity.

The location application as implemented on the location processor allows visualisation of the information e.g., identity and position information. It can further calculate the optimal search path to the rescue target and provide this information for display on a rescue device user interface. This improves the ability of rescue operators to find a distressed person quickly and efficiently. The rescue device may generate an alert to notify the rescue operator that a rescue target has been identified.

The exploration range of a wireless network access point device e.g., a Wi-Fi access point device may be a wider range than a human rescue operator searching in an area. Further Wi-Fi signals can travel a large range e.g., 10 times further than the range of a human thereby expanding the search range. The use of multiple rescue devices, each with a Wi-Fi access device can reduce the manpower to search for a distressed person. The location application further calculates the position of the rescue target from the data e.g., based on signal strength or combination of signal strength or satellite navigation information. This data is more reliable than the subjective judgement of rescue operators.

The rescue system 100 is advantageous because it leverages wireless networking, in particular Wi-Fi networking technology to identify and locate a potential rescue target (i.e., a distressed person). Leveraging the data included in the probe requests and probe responses as per the Wi-Fi protocol, a rescue operator can determine (via the location processor) the location and identity of a detected mobile device. The probe requests and probe responses are continuously exchanged thereby making it simpler to find a rescue target as their device can pair with or at least continuously communicate with the Wi-Fi access point in a rescue device.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The specification refers to probe requests and probe responses when defining communications between the wireless access point devices and the Wi-Fi scanner or hotspot of the mobile device. Probe requests and probe responses denote Wi-Fi messages. Other types of Wi-Fi messages are contemplated and thus included herein. For example, beacon frames may be transmitted by the access point devices or by the hotspot function to announce the presence of wireless network. The specification is described in reference to Wi-Fi but other wireless network protocols are also contemplated and appropriate wireless messages for other wireless networks may be utilised by the mobile device and the wireless access point devices. In one example, wireless network protocols based IEEE802.11 may be utilised as part of the rescue system.

Modifications and variations as would be apparent to a skilled addressee are deemed to be within the scope of the present invention.

What is claimed is:

1. A rescue system for facilitating rescue of a distressed person comprising:

a plurality of rescue devices, each rescue device comprising at least one Wi-Fi access point device;

each Wi-Fi access point device being configured to transmit Wi-Fi messages and receive Wi-Fi messages from a personal mobile device;

a location processor configured to process received Wi-Fi messages from the personal mobile device and identify:

the personal mobile device as being a personal mobile device being associated with a distressed person; and a position of the personal mobile device based on data included in the received Wi-Fi messages;

wherein the received Wi-Fi messages comprise at least one of an SSID, a signal strength indicator, or a device connection status;

wherein the location processor is configured to identify the personal mobile device based on the SSID and determine the position of the personal mobile device based on the signal strength indicator;

wherein the location processor is integrated into at least one of the rescue devices or the location processor is disposed in a rescue agency computing system;

wherein each Wi-Fi access point device is arranged in electronic communication with the location processor and is configured to provide the received Wi-Fi messages to the location processor;

wherein one or more Wi-Fi access point devices are configured to receive one or more Wi-Fi messages from the personal mobile device;

wherein the one or more Wi-Fi access point devices that received a Wi-Fi message are further configured to share the received Wi-Fi messages with other Wi-Fi access point devices of the plurality of rescue devices; and wherein the shared Wi-Fi messages comprise a signal strength value and are used by the plurality of rescue devices to determine a location of the personal mobile device.

2. A rescue system according to claim 1, wherein the personal mobile device comprises a rescue application, the rescue application is configured to operate one or more of:

a Wi-Fi scanner of the mobile device, a hotspot function of the mobile device, location process of the mobile device to gather location information of the mobile device, and the mobile device is configured to provide one or more messages to the Wi-Fi access point device to facilitate rescue of the distressed person.

3. A rescue system according to claim 2 wherein in an operational mode, the rescue application is configured to activate a hotspot function of the mobile device to establish a Wi-Fi network, the Wi-Fi access point device is configured to transmit a Wi-Fi message to explore an area for available networks, wherein the Wi-Fi message is a connection request, the Wi-Fi access point device is configured to receive a Wi-Fi response message from the mobile device hotspot in response to the mobile device receiving the connection request from the Wi-Fi access point device, the Wi-Fi response message from the mobile device including information related to the mobile device, the location processor is configured to process the information related to the mobile device to identify the mobile device the position of the mobile device based on data within the wireless Wi-Fi response message, and wherein the Wi-Fi response message comprises at least one of the SSID, signal strength indicator or connection status.

4. A rescue system according to claim 2, wherein in an operational mode the rescue application is configured to activate the Wi-Fi scanner of the mobile device, the Wi-Fi scanner is configured to scan a local area for an available Wi-Fi network by transmitting one or more Wi-Fi messages, the Wi-Fi access point device configured to receive the Wi-Fi messages and transmit a Wi-Fi response message, the Wi-Fi message received from the mobile device including information related to the mobile device, the location processor configured to process the information related to the mobile device to identify the mobile device and position of the mobile device to facilitate rescue of the distressed person associated with the mobile device.

5. A rescue system according to claim 2, wherein in an operational mode the rescue application is configured to activate the hotspot function of the mobile device and activate the Wi-Fi scanner of the mobile device, the Wi-Fi access point device is configured to transmit one or more Wi-Fi messages to explore an area for available networks, the Wi-Fi access point device is configured to receive a Wi-Fi response message from the mobile device hotspot in response to the mobile device receiving at least one of the one or more Wi-Fi messages from the Wi-Fi access point device, the Wi-Fi response message from the mobile device including information related to the mobile device, the Wi-Fi scanner is configured to scan a local area for an available Wi-Fi network by transmitting one or more Wi-Fi messages, the Wi-Fi access point device configured to receive at least one wireless message from the Wi-Fi scanner and transmit a Wi-Fi response message, the Wi-Fi message received from the mobile device including information related to the mobile device, the location processor being configured to process the information related to the mobile device within received Wi-Fi response and the information related to the mobile device within received Wi-Fi message to identify the mobile device and the position of the mobile device to facilitate rescue of the distressed person associated with the mobile device.

6. A rescue system according to claim 2, wherein the location processor is configured to receive the Wi-Fi messages and process the Wi-Fi messages to identify the mobile device based on the SSID included within the Wi-Fi messages and determine a position of the mobile device relative to the rescue device based on the signal strength indicator included in the Wi-Fi messages.

7. A rescue system according to claim 2 wherein the location processor is configured to:

receive data from the Wi-Fi access point devices, wherein the received data comprises location information and/or signal strength values, determine a search footprint based on the data, wherein the search footprint indicates a possible area the mobile device is likely within, presenting the search footprint on a display.

8. A rescue system according to claim 1, arranged to perform one or more of:

wherein at least one Wi-Fi access point device is configured to detect a hotspot of the mobile device, or, wherein at least one other Wi-Fi access point device is configured to communicate with a Wi-Fi scanner of the mobile device.

9. A rescue system according to claim 8, wherein each rescue device is configured to transmit location information defining a location of the rescue device, the location processor configured to track the location of each rescue device based on the received location information, the location processor further configured to determine the position of the mobile device based on the relative signal strength detected at each rescue device.

10. A rescue system according to claim 1, comprising a location application executable by the location processor, wherein the location application when executed causing the location processor to:

determine the position of the mobile device based on signal strength included in the received Wi-Fi messages, or determine the location of the mobile device based on a signal strength indicator included within a Wi-Fi message request from the mobile device and the location information included in the location signals.

11. A rescue system according to claim 1, wherein the rescue device is configured to generate an alert when:

a fall is detected by the personal mobile device;

inactivity for more than a pre-determine period;

the personal mobile device receives an audio or manual input indicating distress; or, any combination thereof.

12. A rescue system according to claim 11, wherein the location application when executed is configured to cause the location processor to:

generate or access a map of a search area, determine a location of the rescue device based on transmitted location information of the rescue device, calculate a rescue path to the determined location of the mobile device, plot the rescue path on the map, present the rescue path and map on a user interface of the rescue device and/or present the location of the rescue device and the mobile device and movement of the rescue device along the rescue path.

13. A rescue system according to claim 1, wherein each rescue device is a portable rescue device capable of being carried by a rescue operator or mounted on a rescue vehicle, wherein location processor is configured to calculate a search path for each rescue device within the search area, the search path may be any one or more of:

a parallel track search pattern, a sector search pattern, an expanding search pattern.

14. A rescue system according to claim 13, wherein the location processor is configured to:

track the position of each rescue device on the search path, track the position of each rescue device relative to other rescue devices, and, each rescue device comprising a user interface, and the search path of each rescue device, the position of each rescue device on the search path and the position of each rescue device relative to the other rescue devices is presented on user interface of the rescue device.

15. A rescue device for use in a rescue system to facilitate rescue of a distressed person, the rescue system comprising a plurality of rescue devices each comprising a Wi-Fi access point device, the rescue device comprising:

a Wi-Fi access point device;

a power supply electrically coupled to the Wi-Fi access point device;

wherein the Wi-Fi access point device is configured to establish a Wi-Fi network by transmitting Wi-Fi messages to and receiving Wi-Fi messages from one or more mobile devices;

wherein data included in the Wi-Fi messages is used to identify a mobile device associated with a distressed person and identify a position of the mobile device to facilitate rescue of the distressed person;

wherein the Wi-Fi access point device is configured to receive one or more Wi-Fi messages from the mobile device and share the received Wi-Fi messages with other Wi-Fi access point devices of the plurality of rescue devices; and wherein the shared Wi-Fi messages comprise a signal strength value and are used by the plurality of rescue devices to determine a location of the mobile device.

16. A rescue device according to claim 15, comprising a location processor electronically coupled to the Wi-Fi access point device, the location processor including a location application executable by the location processor, the location processor is configured to process the received Wi-Fi messages from the personal mobile device and identify:

the personal mobile device as a personal mobile device being associated with a distressed person;

the position of the personal mobile device based on data included in the received Wi-Fi messages;

wherein the location application when executed causes the location processor to:

determine the position of the mobile device based on signal strength included in a received probe request; or determine the location of the mobile device based on a signal strength indicator included within a received probe request from the mobile device and location information included in location signals;

generate or access a map of a search area, determine a location of the rescue device based on transmitted location information of the rescue device, calculate a rescue path to the determined location of the mobile device, plot the rescue path on the map; and present the rescue path and map on a user interface of the rescue device and/or present the location of the rescue device and the mobile device and movement of the rescue device along the rescue path.

* * * * *